United States Patent
Raghunathan

(10) Patent No.: US 12,282,311 B2
(45) Date of Patent: Apr. 22, 2025

(54) SYSTEM AND METHOD FOR CONTROLLING AN OPERATION OF A MACHINE ACCORDING TO A TASK

(71) Applicant: Mitsubishi Electric Research Laboratories, Inc., Cambridge, MA (US)

(72) Inventor: Arvind Raghunathan, Medford, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 274 days.

(21) Appl. No.: 17/934,826

(22) Filed: Sep. 23, 2022

(65) Prior Publication Data
US 2024/0118677 A1 Apr. 11, 2024

(51) Int. Cl.
*G05B 19/4155* (2006.01)

(52) U.S. Cl.
CPC .......... *G05B 19/4155* (2013.01); *G05B 2219/41406* (2013.01)

(58) Field of Classification Search
None
See application file for complete search history.

(56) References Cited

U.S. PATENT DOCUMENTS

2004/0107012 A1* 6/2004 Das ................. G05B 13/042
700/74

2015/0234779 A1* 8/2015 Raghunathan ...... G06F 18/2411
708/446
2019/0369573 A1* 12/2019 Quirynen ............. G06F 17/11

FOREIGN PATENT DOCUMENTS

EP         1447727          8/2004

OTHER PUBLICATIONS

A. Domahidi, E. Chu, and S. Boyd, "Ecos: An socp solver for embedded systems," in 2013 European Control Conference (ECC), 2013, pp. 3071-3076.
H. Ferreau, H. Bock, and M. Diehl, "An online active set strategy to overcome the limitations of explicit mpc," International Journal of Robust and Nonlinear Control, vol. 18, No. 8, p. 816-830, 2008.

(Continued)

*Primary Examiner* — David Earl Ogg
(74) *Attorney, Agent, or Firm* — Gene Vinokur

(57) ABSTRACT

The present disclosure discloses a system and a method for controlling an operation of a machine according to a task. The method comprises formulating an original quadratic program (QP) for optimizing an objective function subject to equality constraints and inequality constraints, lifting the equality constraints and the inequality constraints into a lifted space by a lifting operation introducing an additional non-negative variable, and transforming the objective function of the original QP into a quadratic objective function. The quadratic objective function subject to the lifted equality and inequality constraints forms a homogeneous QP in the lifted space. The method further comprises solving the homogeneous QP to produce a solution in the lifted space and controlling the machine according to an infeasibility protocol when a value of the additional non-negative variable in the solution in the lifted space equals zero.

23 Claims, 22 Drawing Sheets

(56) References Cited

OTHER PUBLICATIONS

R. Bartlett and L. Biegler, "Qpschur: A dual, active-set, schur-complement method for large-scale and structured convex quadratic programming," Optimization and Engineering, vol. 7, p. 5-32, 2006.
Raghunathan et al. Homogeneous Formulation of Convex Quadratic Programs for Infeasibility Detection, Dec. 14, 2021, pp. 968-973.

* cited by examiner

301 — Original QP $$\min_x \quad \frac{1}{2}x^T Q x + q^T x$$
$$s.t. \quad Ax = b, x \geq 0$$

303 — First-order optimality conditions of original QP $$Qx + q + A^T \lambda - \nu = 0$$
$$Ax = b$$
$$x, \nu \geq 0, x^T \nu = 0$$

305 — Infeasibility conditions of original QP $$A^T \lambda - \nu = 0$$
$$b^T \lambda = -1$$
$$\nu \geq 0$$

FIG. 3

First-order optimality conditions the homogeneous QP — 403

$$Qx + q\tau + A^T\xi - \zeta = 0$$
$$Ax = b\tau$$
$$x, \zeta \geq 0, (x)^T\zeta = 0$$
$$\theta\tau - \kappa + q^T x - b^T\xi - \omega = 0$$
$$\tau, \omega \geq 0, \tau\omega = 0$$

Homogeneous QP — 401

$$\min_{x,\tau} \quad \frac{1}{2}x^T Q x + \tau q^T x + \frac{\theta}{2}\tau^2 - \kappa\tau$$
$$\text{s.t.} \quad Ax = b\tau, x \geq 0, \tau \geq 0$$

FIG. 4

- Choose $(x^0, \tau^0, \xi^0, \zeta^0, \omega^0)$ such that $(x^0, \tau^0, \zeta^0, \omega^0) > 0$, termination tolerance $\epsilon > 0$. ⟵ 501

- Set $k = 0$. Set $\mu^0 = \dfrac{(x^0)^T \zeta^0 + \tau^0 \omega^0}{n+1}$ ⟵ 503

- Repeat until $\|r(x^k, \tau^k, \xi^k, \zeta^k, \omega^k; 0)\| \leq \epsilon$
  - Compute a search direction $d^k = (dx^k, d\tau^k, d\xi^k, d\zeta^k, d\omega^k)$ ⟵ 505
  - Compute a step $\alpha^k \in (0,1]$ to move along the direction $d^k$ such that $x^k + \alpha^k dx^k > 0$, $\zeta^k + \alpha^k d\zeta^k > 0$, $\tau^k + \alpha^k d\tau^k > 0$, and $\omega^k + \alpha^k d\omega^k > 0$. ⟵ 507
  - Set $(x^{k+1}, \tau^{k+1}, \xi^{k+1}, \zeta^{k+1}, \omega^{k+1}) = (x^k, \tau^k, \zeta^k, \omega^k) + \alpha^k(dx^k, d\tau^k, d\xi^k, d\zeta^k, d\omega^k)$ ⟵ 509
  - Set $k = k+1$, set $\mu^{k+1} = \dfrac{(x^{k+1})^T \zeta^{k+1} + \tau^{k+1} \omega^{k+1}}{n+1}$ ⟵ 513

FIG. 5

- Choose $(x^0, \tau^0) = 0$, termination tolerance $\epsilon > 0$ ⏜ 601
- Choose $\mathcal{W}^0 \subseteq \mathcal{A}(x^0, \tau^0)$. Set $k = 0$. ⏜ 603
- For $k = 0, 1, 2, \ldots$
  - Solve EQP($\mathcal{W}^k$) to obtain solution $(x^k, \tau^k)$ and multipliers $\xi^k, \zeta_i^k$ for $i \in \mathcal{W}^k$ ⏜ 605
  - If any $\zeta_i^k < 0$ then ⏜ 607
    - set $\mathcal{W}^{k+1} = \mathcal{W}^k \setminus \{i\}$ for some $i : \zeta_i^k$
  - Else If there exists $i \notin \mathcal{W}^k$ the bound constraint is violated for such an $i$ ⏜ 609 then
    - set $\mathcal{W}^{k+1} = \mathcal{W}^k \cup \{i\}$
  - Otherwise, the solution solves HQP. Stop the loop.

FIG. 6

- Choose $w_x^0, w_\tau^0, \nu^0, \kappa^0$ and termination criteria $\epsilon > 0$. ~701
- Set $k = 0$.
- For $k = 0, 1, 2, \ldots$
  - Solve ADMM-1$(w_x^k, w_\tau^k, \nu^k, \omega^k)$ to obtain $x^{k+1}, \tau^{k+1}$. ~703
  - Solve ADMM-2$(x^{k+1}, \tau^{k+1}, \nu^k, \omega^k)$ to obtain $w_x^{k+1}, w_\tau^{k+1}$. ~705
  - Update the multipliers as $\nu^{k+1} = \nu^k + \beta(x^{k+1} - w_x^{k+1})$ and $\omega^{k+1} = \omega^k + \beta(\tau^{k+1} - w_\tau^{k+1})$. ~707
  - If $\max(\|\|x^{k+1} - w_x^{k+1}\|\|, |\tau^{k+1} - w_\tau^{k+1}|) \leq \epsilon$, ~709
    - then STOP.
  - Else
    - Set $k = k + 1$

FIG. 7

- Choose $x^{prox,0}, \rho > 0, \kappa > 0.$ ~~801~~
- Set $k = 0$.
- For $k = 0, 1, 2, \ldots$
  - Compute parameter $\theta$ using Equation (12) and (13) for ~~803~~ $x^{prox} = x^{prox,k}$.
  - Solve (HProx-LCP($x^{prox,k}$)) to obtain an optimal solution ~~805~~ $x^{*,k}, \tau^{*,k}$
  - If $\tau^{*,k} = 0$ ~~807~~
    - Then the LCP is infeasible
    - Stop the loop.
  - Elseif $\|x^{prox,k} - x^{*,k}\| \leq \epsilon$ ~~809~~
    - Then the optimal solution to LCP is $\frac{x^{*,k}}{\tau^{*,k}}$
    - Stop the loop.
  - Else
    - Set $x^{prox,k+1} = x^{*,k}$ ~~811~~
    - Set $k = k + 1$

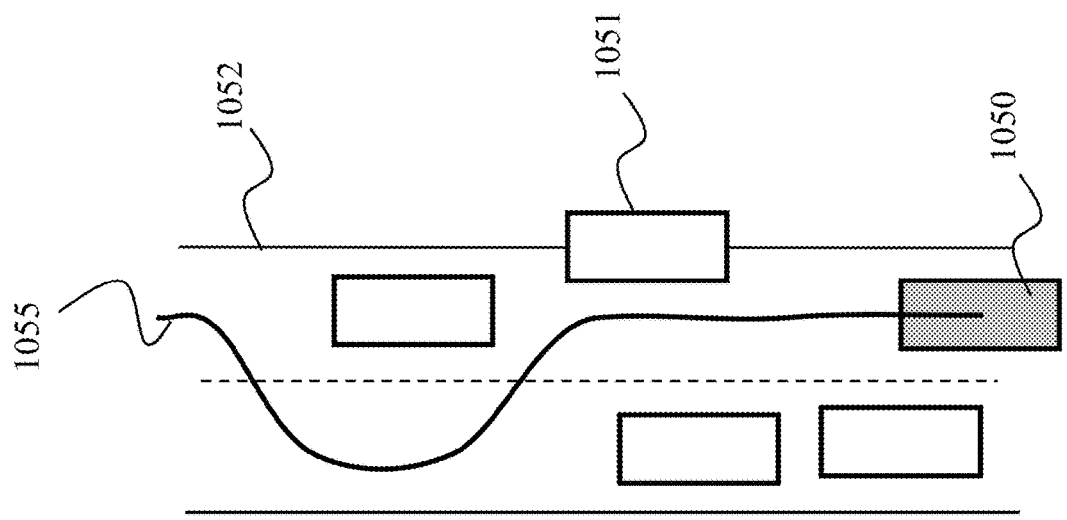

SYSTEM AND METHOD FOR CONTROLLING AN OPERATION OF A MACHINE ACCORDING TO A TASK

TECHNICAL FIELD

This present disclosure relates generally to machine control, and more particularly to a system and a method for controlling an operation of a machine according to a task.

BACKGROUND

Quadratic program is a process of solving certain mathematical optimization problems involving quadratic functions. Specifically, the quadratic program involves optimizing (minimize or maximize) a multivariate quadratic function subject to constraints on variables. Quadratic programming arises as subproblems when solving nonlinear programming.

The quadratic program is widely used for optimization-based control and estimation methods, such as model predictive control (MPC) and moving horizon estimation (MHE). One of the main advantages of these methods is their systematic way of incorporating a dynamic model of a system, limitations in form of inequality constraints, and performance metrics in form of a cost function. At each sampling instant, a model-based predictive controller or estimator solves a multi-stage dynamic optimization problem that minimizes a particular cost function subject to a discrete-time description of the system dynamics and the inequality constraints. A block-sparse quadratic program structure arises in linear or linear time-varying formulations of predictive control and estimation. A similarly structured QP forms subproblems within a sequential quadratic programming (SQP) method for nonlinear optimal control.

To that end, a number of methods have been developed to solve the quadratic program. Examples of the methods for solving the quadratic program include an interior point method, an active set method, an augmented Lagrangian method, and a conjugate gradient or gradient projection method. However, the quadratic program is difficult to solve due to its potential non-convexity and the constraints. To address such a problem, a number of methods reformulate the quadratic program into a different space and solve the reformulated quadratic program. For example, the augmented Lagrangian method solves Lagrangian dual of the quadratic program.

However, while the reformulation of the quadratic program may address some difficulties, another complication still exists, viz., the quadratic program may not have a feasible solution at all. The infeasibility can be caused by situations when the constraints defining different feasible sets do not intersect. For example, the quadratic program may be subject to equality and inequality constraints defining two feasible sets. When the two feasible sets do not intersect, the quadratic program is infeasible. Hence, a critical feature required for solving the quadratic program is detection of the infeasibility of the quadratic program.

SUMMARY

It is an object of some embodiments to provide a system and a method for detecting infeasibility of an original quadratic program (QP). The original QP optimizes an objective function subject to constraints. The constraints may include equality constraints and inequality constraints. Additionally or alternatively, it is object of some embodiments to provide such a system and a method that can determine a solution of the original QP if the original QP is feasible. Additionally, it is object of some embodiments to determine a control command to a machine based on the solution of the original QP, and control the machine based on the control command determined based on the solution of the original QP.

Some embodiments are based on the realization that additionally or alternatively to reformulating the original QP into a different space, it is possible to reformulate constraints into a different space of higher dimensions to ensure that all possible sets defined by different constraints intersect at least at one point. The rationale here is that if an optimal solution of the QP is found to be at that point, solution of the original QP is infeasible. The infeasibility is detected based on convergence of iteration rather than divergence as before. The feasibility detection based on convergence is more efficient and computationally cheaper.

For example, some embodiments, lift the inequality constraints and the equality constraints into a lifted space having a dimension higher than a dimension of an original space of the original QP by a lifting operation. The lifting operation introduces an additional non-negative variable such that a subspace defined by the equality constraint in the lifted space intersects a subspace defined by the inequality constraint in the lifted space at least at a point of origin of the lifted space. In such a manner, the infeasibility of the original QP can be detected when the solution of the QP in the lifted space has the value of the additional non-negative variable equal to zero.

Different lifting operations can be used to transform the constraints from the original space into the lifted space of higher dimensions. Examples of the lifting operations include multiplication of the constraints with one or multiple additional variables defining new dimensions, affine or non-affine transformations of the constraints, and the like.

Some embodiments select such a lifting operation that has a corresponding projection operation that reverses the effects of the lifting operation. For example, if the lifting operation includes multiplication of values in the original space with the additional non-negative variable, the projecting operation includes dividing values in the lifted space by the additional non-negative variable. Similarly, when the lifting operation includes addition of values in the original space by the additional non-negative variable, the projecting operation includes subtraction of the additional non-negative variable from the values in the lifted space.

Some embodiments are based on the recognition that in order to use the constraints in the lifted space, there is a need to transform the original QP from the original space to the lifted space. However, the lifting operation used for lifting the constraints is not directly applicable for lifting the objective function of the original QP since the objective function has quadratic terms and linear terms. Multiplying the quadratic terms by the additional non-negative variable results in an objective function that is a degree 3 polynomial and no longer a quadratic program. In other words, direct application of the lifting operation to the original QP is not possible.

However, some embodiments are based on a realization that regardless of structure of the original QP lifted in the lifted space, a relationship between the optimal solution in the original space and the optimal solution in the lifted space is governed by the lifting operation. Further, the optimal solutions, while unknown, should satisfy first-order optimality conditions. Moreover, the lifting operation for the constraints, while not applicable to the QP objective function, is applicable to the first-order optimality conditions.

To that end, some embodiments, after lifting the constraints into the lifted space with the lifting operation, transform the objective function of the original QP in the original space into a quadratic objective function involving variables of the original QP and the additional non-negative variable. The quadratic objective function subject to the lifted equality and inequality constraints forms a homogeneous QP in the lifted space such that first-order optimality conditions of the homogeneous QP correspond to first-order optimality conditions of the original QP lifted in the higher space by the lifting operation.

Further, the homogeneous QP is solved to produce a solution in the lifted space. If the value of the additional non-negative variable in the solution in the lifted space equals to zero, then, the machine is controlled according to an infeasibility protocol. If the value of the additional non-negative variable in the solution in the lifted space is not equal to zero, then, the solution in the lifted space is projected into the original space using a projection operation reversing the lifting operation, to produce a solution of the original QP. For example, if the equality constraints are lifted in the lifted space by scaling the equality constraints with the additional non-negative variable, then the solution in the lifted space is projected to the original space by dividing the solution in the lifted space with the additional non-negative variable.

Further, in some embodiments, a control command is determined based on the solution of the original QP. Further, the machine is controlled based on the control command determined based on the solution of the original QP.

Different embodiments use different formulations of the homogeneous QP. Any formulation of the homogeneous QP is valid as long as the first-order optimality conditions of the homogeneous QP correspond to the first-order optimality conditions of the original QP lifted in the higher space by the lifting operation. However, some embodiments can impose additional rules on the formulation of the homogeneous QP for different computational and optimization reasons. For example, in one embodiment, the original QP is transformed such that the solution of the homogeneous QP in the lifted space is negative for positive values of the additional non-negative variable. This rule ensures that the optimal value in the lifted space for the feasible original QP problem does not have the value of the additional non-negative variable equal to zero.

Accordingly, one embodiment discloses a controller for controlling an operation of a machine according to a task. The controller comprises a memory configured to store executable instructions, and a processor configured to execute the executable instructions to cause the controller to: collect a feedback signal indicative of a current state of the operation of the machine; formulate an original quadratic program (QP) for optimizing an objective function subject to equality constraints and inequality constraints on one or a combination of state and control variables of the machine based on the task and the current state of the operation of the machine; lift the equality constraints and the inequality constraints into a lifted space having a dimension higher than a dimension of an original space of the original QP by a lifting operation introducing an additional non-negative variable such that a subspace defined by the equality constraints in the lifted space intersects a subspace defined by the inequality constraints in the lifted space at least at a point of origin of the lifted space; transform the objective function of the original QP into a quadratic objective function involving variables of the original QP and the additional non-negative variable, wherein the quadratic objective function subject to the lifted equality and inequality constraints forms a homogeneous QP in the lifted space such that first-order optimality conditions of the homogeneous QP correspond to first-order optimality conditions of the original QP lifted in the higher space by the lifting operation; solve the homogeneous QP to produce a solution in the lifted space; control the machine according to an infeasibility protocol when a value of the additional non-negative variable in the solution in the lifted space equals zero; and otherwise project the solution in the lifted space into the original space using a projection operation reversing the lifting operation to produce a solution of the original QP; and control the machine using a control command determined based on the solution of the original QP.

Accordingly, another embodiment discloses a method for controlling an operation of a machine according to a task. The method comprises collecting a feedback signal indicative of a current state of the operation of the machine; formulating an original quadratic program (QP) for optimizing an objective function subject to equality constraints and inequality constraints on one or a combination of state and control variables of the machine based on the task and the current state of the operation of the machine; lifting the equality constraints and the inequality constraints into a lifted space having a dimension higher than a dimension of an original space of the original QP by a lifting operation introducing an additional non-negative variable such that a subspace defined by the equality constraints in the lifted space intersects a subspace defined by the inequality constraints in the lifted space at least at a point of origin of the lifted space; transforming the objective function of the original QP into a quadratic objective function involving variables of the original QP and the additional non-negative variable, wherein the quadratic objective function subject to the lifted equality and inequality constraints forms a homogeneous QP in the lifted space such that first-order optimality conditions of the homogeneous QP correspond to first-order optimality conditions of the original QP lifted in the higher space by the lifting operation; solving the homogeneous QP to produce a solution in the lifted space; controlling the machine according to an infeasibility protocol when a value of the additional non-negative variable in the solution in the lifted space equals zero; and otherwise projecting the solution in the lifted space into the original space using a projection operation reversing the lifting operation to produce a solution of the original QP; and controlling the machine using a control command determined based on the solution of the original QP.

Accordingly, yet another embodiment discloses a non-transitory computer-readable storage medium embodied thereon a program executable by a processor for performing a method for controlling an operation of a machine according to a task. The method comprises collecting a feedback signal indicative of a current state of the operation of the machine; formulating an original quadratic program (QP) for optimizing an objective function subject to equality constraints and inequality constraints on one or a combination of state and control variables of the machine based on the task and the current state of the operation of the machine; lifting the equality constraints and the inequality constraints into a lifted space having a dimension higher than a dimension of an original space of the original QP by a lifting operation introducing an additional non-negative variable such that a subspace defined by the equality constraints in the lifted space intersects a subspace defined by the inequality constraints in the lifted space at least at a point of origin of the lifted space; transforming the objective function of the original QP into a quadratic objective function involving variables of the original QP and the additional non-negative variable, wherein the quadratic objective function subject to the lifted equality and inequality constraints forms a homogeneous QP in the lifted space such that first-order optimality conditions of the homogeneous QP correspond to first-order optimality conditions of the original QP lifted in the higher space by the lifting operation; solving the homogeneous QP to produce a solution in the lifted space; controlling the machine according to an infeasibility protocol when a value of the additional non-negative variable in the solution in the lifted space equals zero; and otherwise projecting the solution in the lifted space into the original space using a projection operation reversing the lifting operation to produce a solution of the original QP; and controlling the machine using a control command determined based on the solution of the original QP.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 3 shows a schematic of an original QP, first-order optimality conditions of the original QP, and infeasibility conditions of the original QP, according to an embodiment of the present disclosure.

FIG. 4 shows a schematic of a homogeneous QP and first-order optimality conditions of the homogeneous QP, according to an embodiment of the present disclosure.

FIG. 5 shows an Interior Point Method (IPM) algorithm for determining the solution of the homogeneous QP, according to an embodiment of the present disclosure.

FIG. 6 shows a schematic of Active-Set Method (ASM) for determining the solution of the homogeneous QP, according to an embodiment of the present disclosure.

FIG. 7 shows a schematic of Alternating Direction Method of Multipliers (ADMM) for determining the solution of the homogeneous QP, according to an embodiment of the present disclosure.

FIG. 8 shows an algorithm for solving Linear Conic Programs (LCP), according to an embodiment of the present disclosure.

FIG. 10C shows a schematic of a path and/or motion planning for the vehicle, according to some embodiments of the present disclosure.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
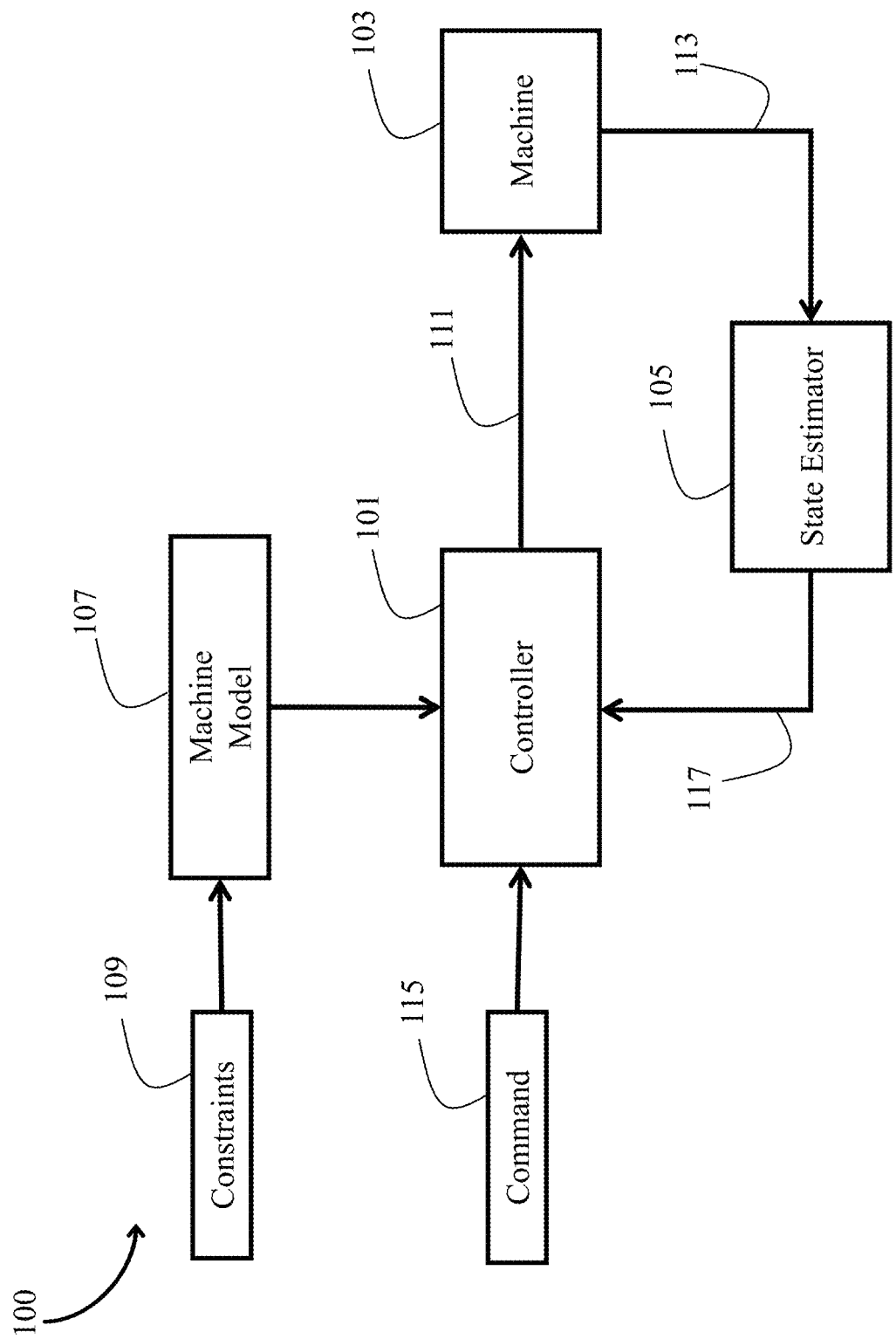
FIG. 1A illustrates an environment for controlling an operation of a machine according to a task, according to some embodiments of the present disclosure.

FIG. 1A illustrates an environment 100 for controlling an operation of a machine 103 according to a task, according to some embodiments of the present disclosure. A controller 101 is operatively connected to the machine 103. The controller 101 is configured to control the operation of the machine 103 according to the task. Examples of the machine 101 may include a vehicle (e.g., an autonomous vehicle), a robotic assembly, a legged robot, a motor, an elevator door, a HVAC (Heating, Ventilating, and Air-Conditioning) system, or the like. For example, the vehicle may be self-driving car, aircraft, spacecraft, dynamically positioned ships, or the like. Examples of the operation of the 103 may include, but are not limited to, operating the vehicle according to a specific objective, operating the HVAC system according to specific parameters, operating a robot arm according to a specific assembly task, and opening/closing elevator doors.

Further, the machine 103 is connected to the controller 101 via a state estimator 105. In some implementations, the controller 101 is programmed according to a model 107 of the machine 103. The machine model 107 can include a set of mathematical equations that describe how a state(s) of the machine 103 changes over time as functions of current and previous inputs and previous outputs of the machine 103. According to an embodiment, the state of the machine 103 is any information, in general time varying, for instance an appropriate subset of current and previous inputs and outputs, that, together with the model 107 of the machine 103 and future inputs, can uniquely define a future motion of the machine 103. The machine model 107 can include constraints 109 that represent physical and operational limitations of the machine 103.

During operation, the controller 101 receives a command 115 indicating a desired behavior of the machine 103. The command can be, for example, a motion command. In response to receiving the command 115, the controller 101 generates a control command 111 that serves as an input for the machine 103. In response to the input, the machine 103 produces an output 113. Based on measurements of the output 113 of the machine 103, the state estimator 105 estimates a state 117 of the operation of the machine 103. The estimated state 117 is fed to the controller 101 as a feedback signal. The estimated state 117 may correspond to a current state of the operation of the machine 103.

The machine 103, as referred herein, can be any system or device controlled by input signals (e.g., input 111), possibly associated to physical quantities such as voltages, pressures, forces, torques, and to return some controlled output signals (e.g., output 113), possibly associated to physical quantities such as currents, flows, velocities, positions indicative of a transition of a state of the machine 103 from a previous state to the current state.

The state estimator 105 can be implemented in hardware or as a software program executed in a processor, either the same or a different processor from the controller 101, which at fixed or variable control period sampling intervals receives the outputs of the machine 103 and determines, using new and the previous output measurements, the estimated state 117 of the machine 101. The controller 101 can be implemented in hardware or as a software program executed in a processor, e.g., a microprocessor. An exemplar implementation of the controller 101 is described below in FIG. 1B.

Figure 1B:
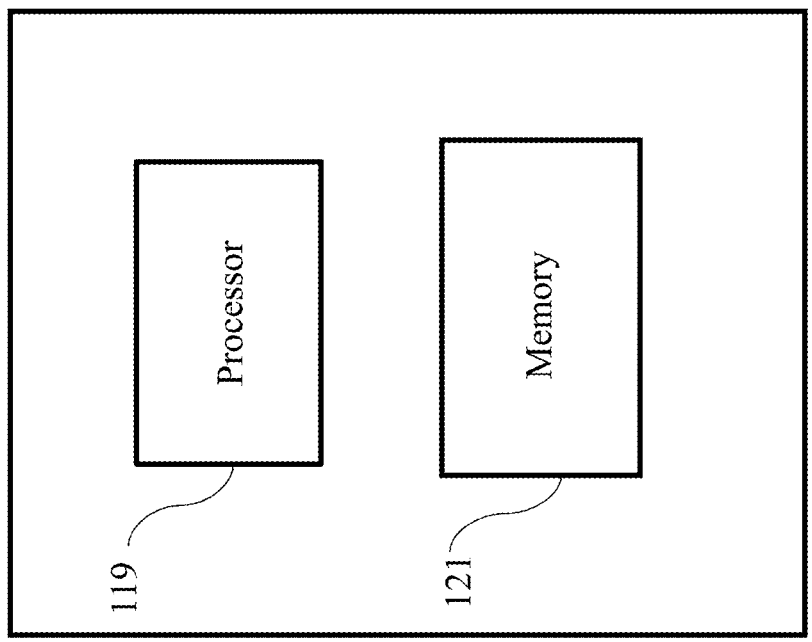
FIG. 1B shows a block diagram of a controller for controlling the operation of the machine, according to an embodiment of the present disclosure.

FIG. 1B shows a block diagram of the controller 101, according to an embodiment of the present disclosure. The controller 101 includes a processor 119 and a memory 121. The processor 119 may be a single core processor, a multi-core processor, a computing cluster, or any number of other configurations. The memory 121 may include random access memory (RAM), read only memory (ROM), flash memory, or any other suitable memory systems. Additionally, in some embodiments, the memory 121 may be implemented using a hard drive, an optical drive, a thumb drive, an array of drives, or any combinations thereof.

The processor 119 may collect a feedback signal indicative of a current state of the operation of the machine 103. Further, the processor 119 formulates an original quadratic program (QP) for optimizing an objective function subject to constraints. The constraints may include equality constraints and inequality constraints on one or a combination of state and control variables of the machine 103 based on the task and the current state of the operation of the machine 103. A general form of the original QP is given as $$\min_x \frac{1}{2}x^T Q x + q^T x \quad \text{Equation (1)}$$

$$\text{s.t. } Ax = b, x \geq 0$$

In Equation (1), variables x are of dimension n i.e. the QP has n optimization variables. The objective function has a quadratic term $(1/2x^T Q x)$ and a linear term $(q^T x)$. Factor 1/2 is included for reasons of consistency with literature and can also be absorbed within a matrix Q if necessary. The objective function is subject to linear equality constraints Ax=b where dimension of b is m, i.e. a number of equality constraints is m, and inequality constraints $x \geq 0$ (i.e., non-negative bounds are imposed on x).

The original QP may solved using methods such as, but not limited to, an interior point method, an active set method, an augmented Lagrangian method, and a conjugate gradient or gradient projection method. However, the original QP is difficult to solve due to its potential non-convexity and the constraints. To address such a problem, the original QP is reformulated into a different space and the reformulated QP is solved. For example, the augmented Lagrangian method solves Lagrangian dual of the quadratic program.

However, while the reformulation of the original QP may address some difficulties, another complication still exists, viz., the original QP may not have a feasible solution at all. The infeasibility can be caused by situations when the constraints defining different feasible sets do not intersect. For example, the original QP may be subject to equality and inequality constraints defining two feasible sets. When the two feasible sets do not intersect, the original QP is infeasible.

Figure 1C:
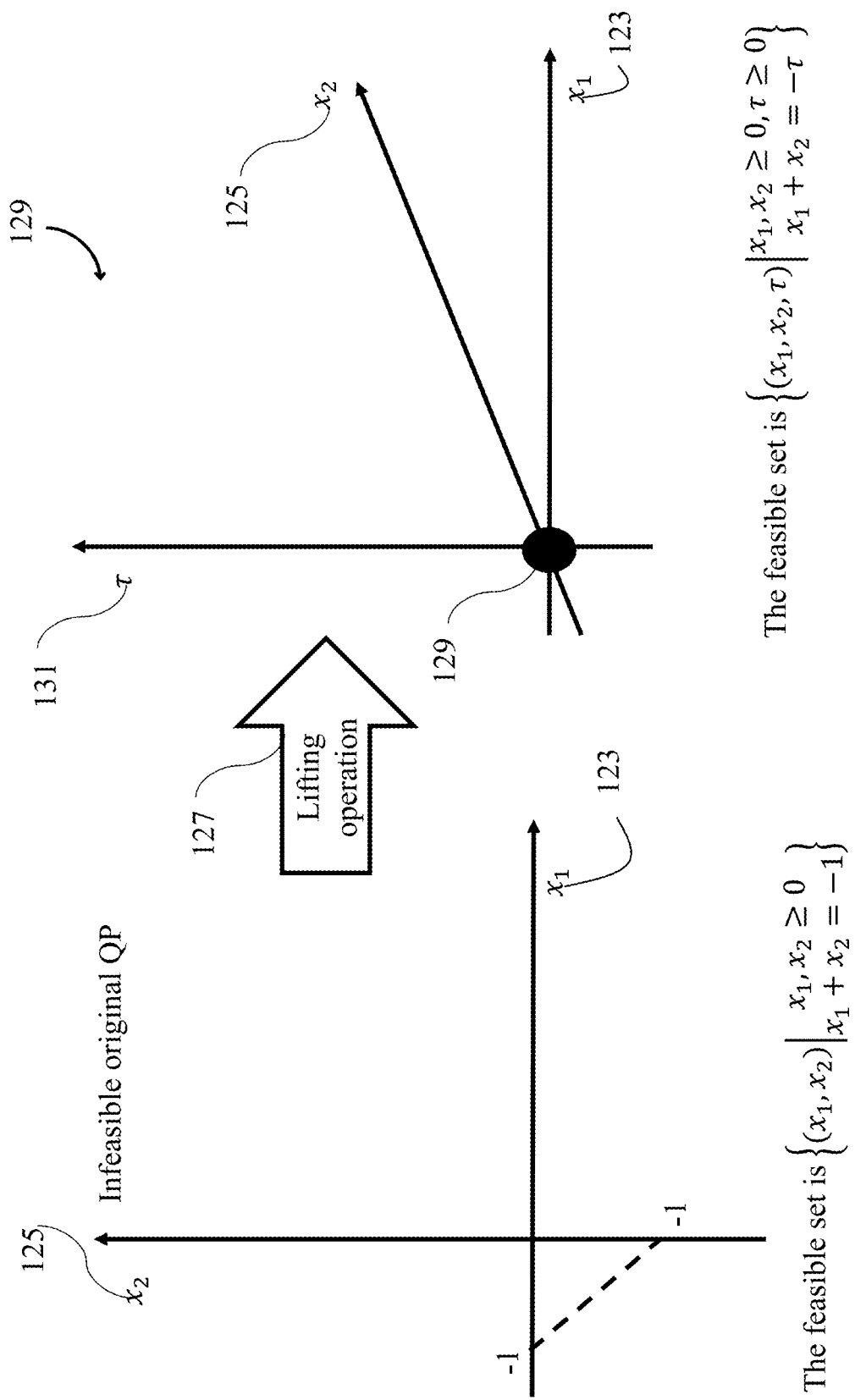
FIG. 1C shows an example of infeasible original quadratic program (QP), according to an embodiment of the present disclosure.

FIG. 1C shows an example infeasible original QP, according to an embodiment of the present disclosure. The original QP may include two dimensions, i.e., $x_1$ 123 and $x_2$ 125. In other words, the original QP is two dimensional. In this case, constraints, e.g., inequality constraint $x_1$, $x_2 \geq 0$ and equality constraint $x_1 + x_2 = -1$, do not intersect and thus no feasible point exists.

Some embodiments are based on the realization that additionally or alternatively to reformulating the original QP into a different space, it is possible to reformulate the constraints into a different space of higher dimensions to ensure that all possible sets defined by different constraints intersect at least at one point. The rationale here is that if an optimal solution of the original QP is found to be at that point, solution of the original QP is infeasible.

For example, in an embodiment, the processor 119 lifts the inequality constraints (e.g., $x_1$, $x_2 \geq 0$) and the equality constraints (e.g., $x_1 + x_2 = -1$) into a lifted space 129 having a dimension higher than a dimension of an original space of the original QP by a lifting operation 127. For instance, the lifted space 129 has three dimensions, namely, $x_1$ 123, $x_2$ 125, and $\tau$ 131, whereas the original space of the original QP is two dimensional, i.e., $x_1$ 123 and $x_2$ 125. The lifting operation 127 introduces an additional non-negative variable $\tau$ such that a subspace defined by the equality constraint in the lifted space 129 intersects a subspace defined by the inequality constraint in the lifted space at least at a point of origin 129 of the lifted space 129. In such a manner, the infeasibility of the original QP can be detected when the solution of the QP in the lifted space 129 has the value of the additional non-negative variable $\tau$ equal to zero.

Different lifting operations can be used to transform the constraints from the original space into the lifted space 129 of higher dimensions. Examples of the lifting operations include multiplication of the constraints with one or multiple additional variables defining new dimensions, affine or non-affine transformations of the constraints, and the like.

Some embodiments select such a lifting operation that has a corresponding projection operation that reverses the effects of the lifting operation. For example, if the lifting operation 127 includes multiplication of values in the original space with the additional non-negative variable, the projecting operation includes dividing values in the lifted space 129 by the additional non-negative variable. Similarly, when the lifting operation 127 includes addition of values in the original space by the additional non-negative variable, the projecting operation includes subtraction of the additional non-negative variable from the values in the lifted space 129.

Some embodiments are based on the recognition that in order to use the constraints in the lifted space 129, there is a need to transform the original QP from the original space to the lifted space 129. However, the lifting operation 127 used for lifting the constraints is not directly applicable for lifting the objective function of the original QP since the objective function has quadratic terms and linear terms. Multiplying the quadratic terms by the additional non-negative variable r results in an objective function that is a degree 3 polynomial and no longer a quadratic program. In other words, direct application of the lifting operation 127 to the original QP is not possible.

However, some embodiments are based on a realization that regardless of structure of the original QP lifted in the lifted space 129, a relationship between the optimal solution in the original space and the optimal solution in the lifted space 129 is governed by the lifting operation 127. Further, the optimal solutions, while unknown, should satisfy first-order optimality conditions. Moreover, the lifting operation 127 for the constraints, while not applicable to the QP objective function, is applicable to the first-order optimality conditions. Based on such a realization, the objective function of the original QP is transformed into a quadratic objective function as described below in FIG. 1D.

Figure 1D:
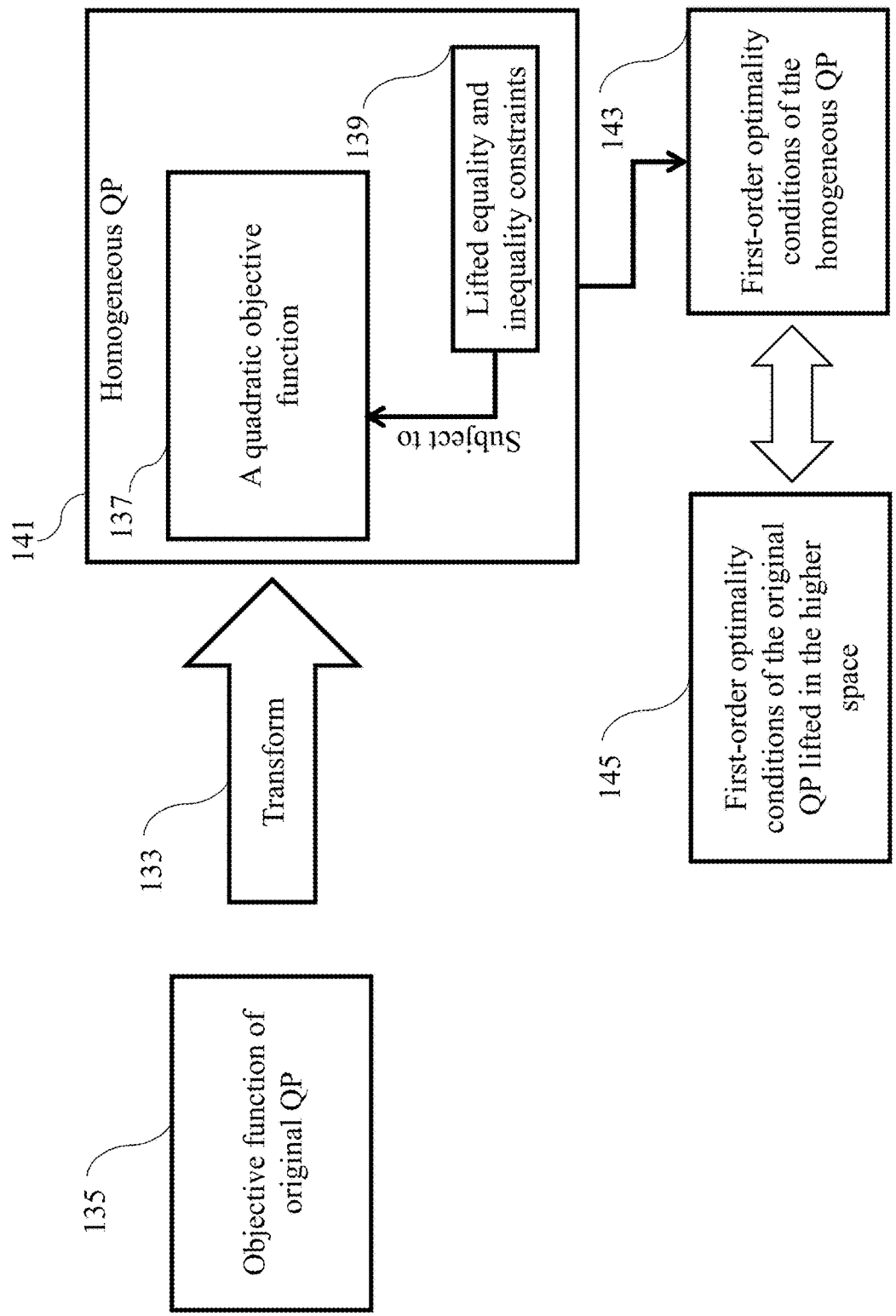
FIG. 1D illustrates a transformation of an objective function of an original QP into a quadratic objective function, according to an embodiment of the present disclosure.

FIG. 1D illustrates the transformation of the objective function of the original QP into the quadratic objective function, according to an embodiment of the present disclosure. After lifting the constraints into the lifted space 129, the processor 119 transforms 133 an objective function 135 of the original QP into a quadratic objective function 137 involving variables of the original QP and the additional non-negative variable τ. The quadratic objective function 137 subject to the lifted equality and inequality constraints 139 forms a homogeneous QP 141 in the lifted space 129 such that first-order optimality conditions 143 of the homogeneous QP 141 correspond to first-order optimality conditions 145 of the original QP lifted in the higher space by the lifting operation 127.

Further, the processor 119 solves the homogeneous QP 141 to produce a solution in the lifted space and, subsequently, controls the machine 103 based on the solution in the lifted space, as described below in FIG. 1E.

Figure 1E:
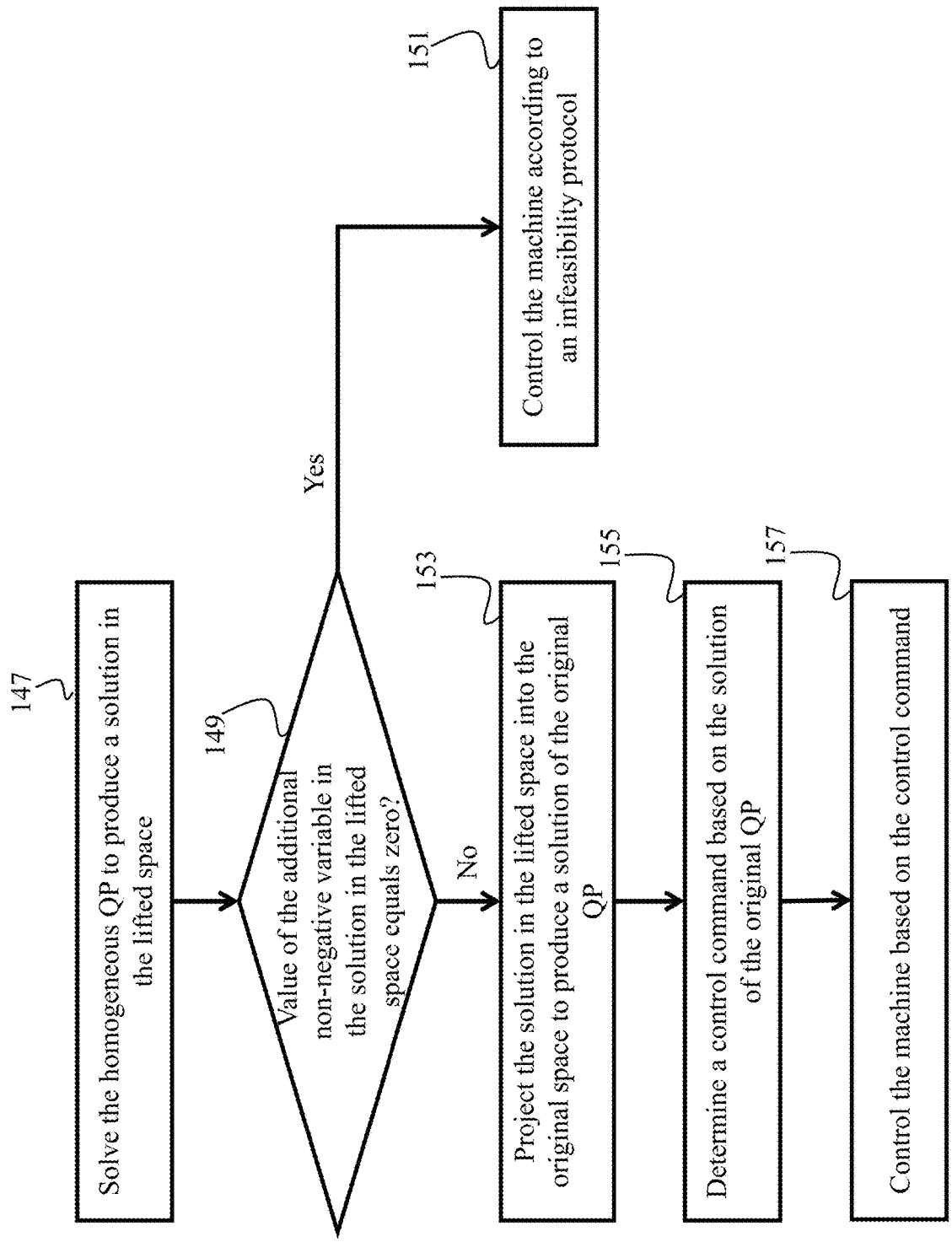
FIG. 1E shows a block diagram for solving a homogeneous QP to produce a solution in a lifted space and controlling the machine based on the solution in the lifted space, according to an embodiment of the present disclosure.

FIG. 1E shows a block diagram for solving the homogeneous QP 141 to produce the solution in the lifted space and controlling the machine 103 based on the solution in the lifted space, according to an embodiment of the present disclosure. At block 147, the processor 147 solves the homogeneous QP to produce a solution in the lifted space.

At block, 149 the processor determines if a value of the additional non-negative variable in the solution in the lifted space equals to zero. If the value of the additional non-negative variable in the solution in the lifted space equals to zero, then, at block 151, the processor 119 controls the machine 103 according to an infeasibility protocol. The infeasibility protocol can be to use an alternate method of controlling the machine ignoring some of the inequality constraints or relaxing the inequality constraints. One type of relaxing the inequality constraints may be to remove the nonnegativity bounds.

If the value of the additional non-negative variable in the solution in the lifted space is not equal to zero, then, at block 153, the processor 119 projects the solution in the lifted space 129 into the original space using a projection operation reversing the lifting operation, to produce a solution of the original QP. For example, if the equality constraints are lifted in the lifted space 129 by scaling the equality constraints with the additional non-negative variable, then the solution in the lifted space 129 is projected to the original space by dividing the solution in the lifted space with the additional non-negative variable.

At block 155, the processor 119 determines a control command based on the solution of the original QP. Further, at block 157, the processor 119 controls the machine 103 based on the control command determined based on the solution of the original QP.

The formulation of the original QP and the homogeneous QP 141 is mathematically described below.

Original QP

A general form of the original QP may be given as $$\min_{y} \frac{1}{2} y^T Q_y y + q_y^T y \qquad \text{Equation (2)}$$

$$\text{s.t. } A^{eq} y = b^{eq},\ b^{in,lb} \leq A^{in} y \leq b^{in,ub},\ \text{lb} \leq y \leq ub$$

where y is of dimension $n_y$, a number of equality constraints $A^{eq}y=b^{eq}$ is of dimension $m^{eq}$, a number of inequality constraints $b^{in,lb} \leq A^{in}y \leq b^{in,ub}$ is of dimension $m^{in}$, and lb,ub are $n_y$ dimension lower and upper bounds on variable y.

The formulation in equation (1) is generic and can be obtained for example from the more general formulation in equation (2) by introducing additional variables as described in Equation (3) and Equation (4). The formulation in equation (2) is converted by adding additional variables for the constraints, so that the inequality constraints in equation (2) are converted to equality constraints, as $$\min_{y,s^{in}} \frac{1}{2} y^T Q_y y + q_y^T y \qquad \text{Equation (3)}$$

$$\text{s.t. } A^{eq} y = b^{eq},\ A^{in} y + s^{in} = 0, \begin{pmatrix} \text{lb} \\ b^{in,lb} \end{pmatrix} \leq \begin{pmatrix} y \\ s^{in} \end{pmatrix} \leq \begin{pmatrix} ub \\ b^{in,ub} \end{pmatrix}$$

where variables $s^{in}$ are additional variables of dimension $m^{in}$. Equation (3) is a formulation with equality constraints and lower, upper bounds on the variables. New variables $w^l$, $w^u$ each of dimension $n_y+m^{in}$ and additional equality constraints are introduced as $$\min_{w^l,w^u} \frac{1}{2}\left(w^l + \begin{pmatrix}\text{lb}\\b^{in,lb}\end{pmatrix}\right)^T \begin{pmatrix}Q_y & 0\\0 & 0\end{pmatrix}\left(w^l + \begin{pmatrix}\text{lb}\\b^{in,lb}\end{pmatrix}\right) + \qquad \text{Equation (4)}$$

$$\begin{pmatrix}q_y\\0\end{pmatrix}^T \left(w^l + \begin{pmatrix}\text{lb}\\b^{in,lb}\end{pmatrix}\right)$$

-continued $$\text{s.t.} \left(A^{eq} \ 0\right)\left(w^l + \begin{pmatrix} \text{lb} \\ b^{in,lb} \end{pmatrix}\right) = b^{eq}, \left(A^{in} \ 0\right)\left(w^l + \begin{pmatrix} \text{lb} \\ b^{in,lb} \end{pmatrix}\right) = 0$$

$$w^l + w^u = \begin{pmatrix} ub - \text{lb} \\ b^{in,ub} - b^{in,lb} \end{pmatrix}, w^l, w^u \geq 0 \quad \quad 5$$

The formulation in equation (4) has $2(n_y+m^{in})$ variables, $(m^{eq}+m^{in}+n_y+m^{in})$ equality constraints and nonnegative bounds on all the variables. The variables and constraints in the original QP in equation (1) can be readily deduced from the formulation in equation (4), demonstrating that the original QP in equation (1) can be readily obtained from the general QP formulation in equation (2).

Homogeneous QP

Different embodiments use different formulations of the homogeneous QP. Any formulation of the homogeneous QP is valid as long as the first-order optimality conditions of the homogeneous QP correspond to the first-order optimality conditions of the original QP lifted in the higher space by the lifting operation.

However, some embodiments can impose additional rules on the formulation of the homogeneous QP for different computational and optimization reasons. For example, in one embodiment, the original QP is transformed such that the solution of the homogeneous QP in the lifted space is negative for positive values of the additional non-negative variable. This rule ensures that the optimal value in the lifted space for the feasible original QP problem does not have the value of the additional variable equal to zero.

Additionally or alternatively, some embodiments impose additional requirements on values of constants in the homogeneous QP. For example, in one embodiment, the homogeneous QP includes a quadratic term of the additional non-negative variable scaled with a scalar. The quadratic term of the additional non-negative variable is added to the original QP in order to ensure that the additional non-negative variable can take a positive value at an optimal solution of the homogeneous QP when the original QP is feasible.

Figure 2:
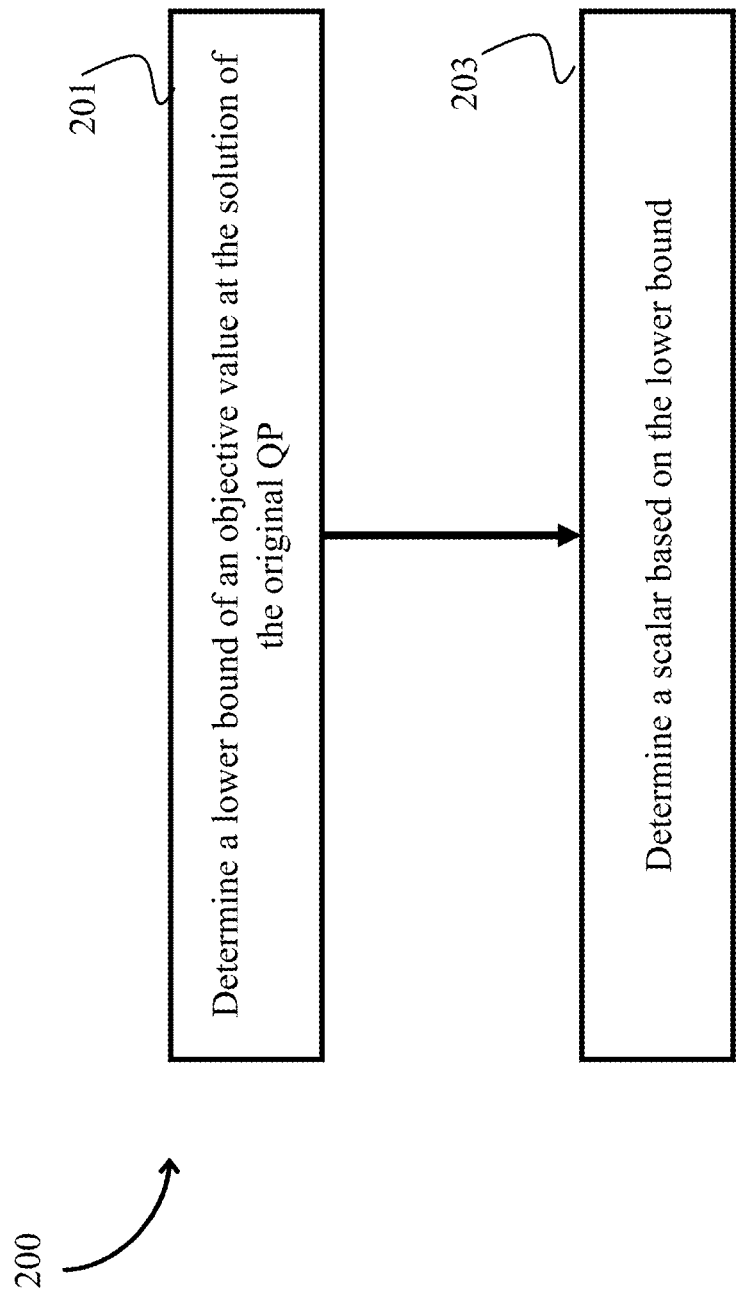
FIG. 2 shows a block diagram a for determining a scalar of a quadratic term of an additional non-negative variable, according to an embodiment of the present disclosure.

FIG. 2 shows a block diagram 200 for determining the scalar of the quadratic term of the additional non-negative variable, according to an embodiment of the present disclosure. At block 201, the processor 119 determines a lower bound of an objective value at the solution of the original QP to ensure that the additional non-negative variable can take a positive value at an optimal solution of the homogeneous QP when the original QP is feasible. Further, at block 203, the processor 203 determines the scalar based on the lower bound. For example, in one embodiment, the scalar is a positive value greater than two times the negative of the lower bound. This is advantageous because it is sufficient to ensure that the additional non-negative variable will be positive at the optimal solution to the homogeneous QP.

For example, in one embodiment, the homogeneous QP includes a quadratic term of the original QP, a linear term of the original QP scaled by the additional non-negative variable, a quadratic term of the additional non-negative variable scaled by a scalar selected to be greater than two times the negative of the lower bound of the original QP and a negative linear term of the additional positive variable. This formulation of the homogeneous QP is advantageous because it is still quadratic, and hence the legacy methods for solving the original QP are applicable to solve the homogeneous QP. Also, this formulation ensures the correspondence of the lifted optimality conditions and has an optimal value for positive additional variables when the original QP is feasible. For example, the homogeneous QP may be given as $$\min_{x,\tau} \frac{1}{2} x^T Q x + \tau q^T x + \frac{\theta}{2} \tau^2 - \kappa \tau \quad \quad \text{Equation (5)}$$

$$\text{s.t.} \ Ax = b\tau, x \geq 0, \tau \geq 0$$

where $\theta, \kappa > 0$ are parameters. The equality constraints in the homogeneous QP are obtained by multiplying right hand side of the equality constraints in the original QP (1) with the additional non-negative variable $\tau$. The additional non-negative variable is a single additional variable. The linear term $(q^T x)$ in the objective function of the original QP is transformed to a quadratic term by multiplying it with $\tau$. The objective function in the homogeneous QP also includes a quadratic term in the additional non-negative variable $\tau$ that is given by $$\frac{\theta}{2} \tau^2.$$

The objective function in the homogeneous QP also includes a linear term $-\kappa \tau$.

In Equation (5), the multiplication of the right hand side of the equality constraint is termed the lifting of the equality constraint in the original QP to obtain the equality constraints in the lifted space of x and the additional non-negative variable $\tau$. A key property of the lifted equality constraint $Ax=b\tau$ is that $x=0, \tau=0$ is feasible for the lifted equality constraint and the nonnegativity constraints $x \geq 0$, $\tau \geq 0$ in the homogeneous QP. This ensures that the homogeneous QP is always feasible. Hence, an optimal solution of the homogeneous QP is readily obtained.

If the original QP is infeasible, then there does not exist a $\hat{x}$ such that $A\hat{x}=b$, $\hat{x} \geq 0$. In this case, only points that are feasible in the homogeneous QP are the points $(\tilde{x}, 0)$ where $A\tilde{x}=0$. Thus, the infeasibility of the original QP can be determined if solving the homogeneous QP obtains an optimal solution with the additional non-negative variable equal to zero at the optimal solution.

If the original QP is feasible, then there exists an optimal solution x* of the original QP and satisfies the first-order optimality conditions $$Qx^* + q + A^T \lambda^* - v^* = 0$$

$$Ax^* = b$$

$$x^*, v^* \geq 0, (x^*)^T v^* = 0 \quad \quad \text{Equation (6)}$$

where $\lambda^*, v^*$ are Lagrange multipliers for the equality constraints and bounds in the original QP.

FIG. 3 shows a schematic of an original QP 301, first-order optimality conditions of the original QP 303, and infeasibility conditions of the original QP 305, according to an embodiment of the present disclosure. According to an embodiment, if the original QP 301 is feasible and x* solves the original QP, then there exists $(x^*, \lambda^*, v^*)$ satisfying the first-order optimality conditions of the original QP 303. If the original QP 301 is infeasible, then there exists $(\lambda^*, v^*)$ satisfying the infeasibility conditions of the original QP 305.

Further, according to some embodiments, a point $(x^\circ, \tau^\circ)$ satisfies the first-order optimality conditions for the homogeneous QP if the following conditions are satisfied $$Qx^o + q\tau^o + A^T\xi^o - \zeta^o = 0$$

$$Ax^o = b\tau^o$$

$$x^o, \zeta^o \geq 0, (x^o)^T \zeta^o = 0$$

$$\theta^o - K + q^T x^o - b^T \xi^o - \omega^o = 0$$

$$\tau^o, \omega^o \geq 0, \tau^o \omega^o = 0 \quad \text{Equation (7)}$$

where $\xi^o$, $\zeta^o$ are Lagrange multipliers for the lifted equality constraints and bound constraints on x in the homogeneous QP. The Lagrange multiplier $\omega^o$ is for the nonnegativity on the additional non-negative variable.

The multiplication of the linear term in the objective function of the original QP by the additional non-negative variable to lift the linear term in the original QP to a quadratic term in the homogeneous QP ensures that the first condition in equation (7) is linear. This allows any solution (x*, λ*, ν*) can now be lifted to (τ°x*, τ°λ*, τ°ν*) such that it satisfies the first three conditions in equation (7). The homogeneous QP and the first-order optimality conditions of the homogeneous QP 401 are described below in FIG. 4.

FIG. 4 shows a schematic of a homogeneous QP 401 and first-order optimality conditions 403 of the homogeneous QP 401, according to an embodiment of the present disclosure. According to some embodiments, if the original QP 301 is feasible and x* solves the original QP 301, then there exists $(x^o, \tau^o, \xi^o, \zeta^o, \omega^o)$ satisfying first-order optimality conditions 403 of the homogeneous QP 401 with $\tau^o > 0$. Further, $$\left(\frac{x^o}{\tau^o}, \frac{\xi^o}{\tau^o}, \frac{\zeta^o}{\tau^o}\right)$$

satisfies the first-order optimality conditions of the original QP 303. According to some other embodiments, if the original QP 301 is infeasible, then there exists $(x^o, \tau^o, \xi^o, \zeta^o, \omega^o)$ satisfying first-order optimality conditions 403 of the homogeneous QP 401 with $x^o = 0$, $\tau^o = 0$. Further, $$\left(\frac{\xi^o}{\kappa + \omega^o}, \frac{\zeta^o}{\kappa + \omega^o}\right)$$

satisfies the infeasibility conditions of the original QP 305.

In order to ensure that $\tau^o > 0$ exists, parameter θ (also referred to as scalar) in the homogeneous QP 403 is chosen to satisfy $$\theta + (x^*)^T Q x^* + 2 q^T x^* > 0. \quad \text{Equation (8)}$$

Since x* is not known apriori, choose θ+2LBObj>0 where LBObj≤(x*)$^T$Qx*+2q$^T$x*, i.e. LBObj is a lower bound on an objective value of the original QP.

In one embodiment, the lower bound on the objective value of the original QP is obtained by solving an equality constraint problem $$\min_x \frac{1}{2} x^T Q x + q^T x \quad \text{Equation (9)}$$

$$\text{s.t.} \quad Ax = b$$

The optimization problem in equation (9) is obtained from the original QP by ignoring the bound constraints. Thus, optimal solution to equation (9) is a lower bound to the original QP which is more constrained.

Some embodiments are based on realization the homogeneous QP (e.g., the homogeneous QP 401) may be solved using algorithms that are used to solve the original QP. To that end, the algorithms that solve the original QP can now be applied to the homogeneous QP to determine the solution of the homogeneous QP. As described, the solution of the homogeneous QP, which always exists, can then be used to determine if the original QP has an optimal solution or is infeasible. Let a point (x°, τ°) solve the homogeneous QP which always exists since the homogeneous QP is always feasible. If τ°=0, then the original QP can be declared to be infeasible. If τ°>0, then the solution to the original QP is obtained by the projection operation defined as $$\frac{x^o}{\tau^o}.$$

In an embodiment, the projection operation transforms a solution of the first-order conditions of the homogeneous QP whenever the additional non-negative variable is positive, to satisfy the first-order conditions of the original QP.

In an embodiment, an Interior Point Method (IPM) is employed to determine the solution of the homogeneous QP. The IPM that is used to solve the homogeneous QP is identical to the IPM that can be used for the original QP. The IPM aims to obtain a solution to the first-order stationary conditions in equation (7). Quantities are defined as $$r_{d,x}(x, \tau, \xi, \zeta, \omega; \mu) = Qx + q\tau + A^T\xi - \zeta \quad \text{Equation (10)}$$

$$r_{p,x}(x, \tau, \xi, \zeta, \omega; \mu) = Ax - b\tau$$

$$r_{c,x}(x, \tau, \xi, \zeta, \omega; \mu) = X\zeta - \mu e$$

$$r_{d,\tau}(x, \tau, \xi, \zeta, \omega; \mu) = \theta\tau - \kappa + q^T x - b^T \xi - \omega$$

$$r_{c,\tau}(x, \tau, \xi, \zeta, \omega; \mu) = \tau\omega$$

where e represents a vector all ones of dimension n. Residual r(x,τ,ξ,ζ,ω;μ) is defined as $$r(x, \tau, \xi, \zeta, \omega; \mu) = \begin{pmatrix} r_{d,x}(x, \tau, \xi, \zeta, \omega; \mu) \\ r_{p,x}(x, \tau, \xi, \zeta, \omega; \mu) \\ r_{c,x}(x, \tau, \xi, \zeta, \omega; \mu) \\ r_{d,\tau}(x, \tau, \xi, \zeta, \omega; \mu) \\ r_{c,\tau}(x, \tau, \xi, \zeta, \omega; \mu) \end{pmatrix}$$

FIG. 5 shows an IPM algorithm 500 for determining the solution of the homogeneous QP, according to an embodiment of the present disclosure. At step 501, $(x^0, \tau^0, \xi^0, \zeta^0, \omega^0)$ is chosen such that $(x^0, \tau^0, \xi^0, \zeta^0, \omega^0) > 0$, and termination tolerance considered as $\epsilon > 0$. At step 503, k and $\mu^0$ are set as k=0 and $$\mu^0 = \frac{(x^0)^T \zeta^0 + \tau^0 \omega^0}{n+1}.$$

Further, an iterative procedure is conducted until $\|r(x^k, \tau^k, \xi^k, \zeta^k, \omega^k; 0)\| \leq \epsilon$.

In an iteration of the iterative procedure, at step 505 a search direction $d^k = (dx^k, d\tau^k, d\xi^k, d\zeta^k, d\omega^k)$ is computed. At step 507, a step $\alpha^k \in (0,1]$ is computed to move along the direction $d^k$ such that $x^k + \alpha^k dx^k > 0, \zeta^k + \alpha^k d\zeta^k > 0, \tau^k + \alpha^k d\tau^k > 0$, and $\omega^k + \alpha^k d\omega^k > 0$.

At step 509, $(x^{k+1},\tau^{k+1},\xi^{k+1},\zeta^{k+1},\omega^{k+1})$ is set as $(x^{k+1}, \tau^{k+1},\xi^{k+1},\zeta^{k+1},\omega^{k+1})=(x^k,\tau^k,\xi^k,\zeta^k,\omega^k)+\alpha^k(dx^k,d\tau^k,d\zeta^k,d\omega^k)$. Further, at step 511, k and $\mu^{k+1}$ are set as k=k+1 and $$\mu^{k+1} = \frac{(x^{k+1})^T \zeta^{k+1} + \tau^{k+1}\omega^{k+1}}{n+1}$$

In one embodiment, m the direction $d^k$ is obtained by solving a linear system $$\begin{pmatrix} Q & A^T & -I & q & 0 \\ A & 0 & 0 & -b & 0 \\ \text{Diag}(\xi^k) & 0 & \text{Diag}(x^k) & 0 & 0 \\ q^T & -b^T & 0 & \theta & -1 \\ 0 & 0 & 0 & \omega^k & \tau^k \end{pmatrix} \begin{pmatrix} dx^k \\ d\xi^k \\ d\zeta^k \\ d\tau^k \\ d\omega^k \end{pmatrix} = -r(x^k,\tau^k,\xi^k,\zeta^k,\omega^k;\mu^k)$$

where Diag(a) is a diagonal matrix with elements of vector a on the diagonal.

Additionally, in an embodiment, Active-Set Method (ASM) is employed to determine the solution of the homogeneous QP. ASM proceeds by choosing a subset of bounds as being satisfied as equality. Using the chosen subset, an equality constrained QP is solved. If multipliers for chosen bound constraints that satisfy as equality are all nonnegative and the rest of the bound constraints are also satisfied, then an obtained solution is optimal. If not, constraints with negative multipliers are dropped and then infeasible constraints are added. In the following, an active set at a point $(x,\tau)$ is defined as $$\mathcal{A}(x,\tau)=\{i|x_i=0\text{ for }i=1,\ldots,n\}\cup\{n+1|\tau=0\}$$

A working set at a point $(x,\tau)$ denoted as $\mathcal{W}\subseteq\{1,\ldots,n+1\}$ such that the constraints $Ax=b$ and $x_i=0$ for $i\in\mathcal{W}$ is linearly independent. The Equality constraint QP (EQP) corresponding to active constraints in $\mathcal{W}$ is defined as $$\min_{x,\tau} \quad \frac{1}{2}x^T Qx + \tau q^T x + \frac{\theta}{2}\tau^2 - \kappa\tau \qquad \text{EQP}(W)$$
$$\text{s.t.} \quad Ax=b\tau,\ x_i=0 \text{ if } i\in W,\ \tau=0 \text{ if } n+1\in W$$

The solution to EQP($\mathcal{W}$) is denoted as $x(\mathcal{W})$ and multiplier $\xi(\mathcal{W})$ for equality constraints, bound multipliers $\zeta(\mathcal{W}),\omega(\mathcal{W})$.

FIG. 6 shows a schematic of the ASM 600, according to an embodiment of the present disclosure. At step 601, $(x^0,\tau^0)$ is chosen as $(x^0,\tau^0)=0$ and termination tolerance considered as $\in >0$. At step 603, $\mathcal{W}^0$ is chosen as $\mathcal{W}^0 \subseteq \mathcal{A}(x^0,\tau^0)$ and k is set as k=0. Further, an iterative procedure is conducted. In an iteration of the iterative procedure, at step 605, EQP($\mathcal{W}^k$) is solved to obtain solution $(x^k,\tau^k)$ and multipliers $\xi^k,\zeta_i^k$ for $i\in\mathcal{W}^k$. If any $\zeta_i^k<0$, then at step 607 $\mathcal{W}^{k+1}$ is set as $\mathcal{W}^{k+1}=\mathcal{W}^k\setminus\{i\}$ for some i: $\zeta_i^k$, else if there exists $i\notin\mathcal{W}^k$ the bound constraint is violated then at step 609 $\mathcal{W}^{k+1}$ is set as $\mathcal{W}^{k+1}=\mathcal{W}^k\cup\{i\}$ for such an i.

Additionally or alternatively, in an embodiment, Alternating Direction Method of Multipliers (ADMM) is employed to determine the solution of the homogeneous QP. The ADMM splits the solution of the homogeneous QP into two parts which are admittedly easier to solve and then alternates between the two while updating a multiplier that connects the two parts. There are several approaches for splitting the solution of the homogeneous QP. For example, in an embodiment, in which a first part of the two parts includes equality constrained program and a second part of the two parts is projection onto nonnegative orthant. The first part is $$\min_{x,\tau} \quad \frac{1}{2}x^T Qx + q^T x + \frac{\theta}{2}\tau^2 - \kappa\tau + \frac{\beta}{2}\|x-w_x+v\|^2 + \frac{\beta}{2}(\tau-w_\tau+\omega)^2$$
$$\text{s.t.} \qquad AX=b$$
$$\text{ADMM-1}(w_x, w_\tau, v, \omega)$$

The second part is $$\min_{w_x,w_\tau} \quad \|x-w_x+v\|^2 + (\tau-w_\tau+\omega)^2$$
$$\text{s.t.} \qquad x\geq 0,\ \tau\geq 0$$
$$\text{ADMM-2}(x,\tau,v,\omega)$$

FIG. 7 shows a schematic of the ADMM 700 applied to the homogeneous QP, according to an embodiment of the present disclosure. At step 701, $w_x^0, w_\tau^0, v^0, \kappa^0$ are chosen and termination criteria considered as $\in >0$. Further, an iterative procedure is conducted. In an iteration of the iterative procedure, at step 703, ADMM-1($w_x^k, w_\tau^k, v^k, \omega^k$) is solved to obtain $x^{k+1}, \tau^{k+1}$. At step 705, ADMM-2($x^{k+1},\tau^{k+1},v^k,\omega^k$) is solved to obtain $w_x^{k+1}, w_\tau^{k+1}$. At step 707, Multipliers are updated as $v^{k+1}=v^k+\beta(x^{k+1}-w_x^{k+1})$ and $\omega^{k+1}=\omega^k+\beta(\tau^{k+1}-w_\tau^{k+1})$ If $\max(\|x^{k+1}-w_x^{k+1}\|, |\tau^{k+1}-w_\tau^{k+1}|)\leq\in$, then at step 709 the iteration is stopped, else, at step 711 the next iteration is initiated by setting k=k+1. In one embodiment, parameter $\beta$ is changed at every iteration.

Some embodiments are based on realization that, in addition to the original QP, Linear Conic Programs (LCP) can also be solved as the original QP is solved (as described in FIGS. 1C-1E). LCP are optimization problems with linear objective, linear equality constraints and conic constraints. In an embodiment, LCP is formulated as $$\min_x \quad q^T x \qquad \qquad \text{Equation (11)}$$
$$\text{s.t.} \quad Ax=b,\ x\in\mathcal{K}$$

where $\mathcal{K}$ is a pointed, convex cone which includes an origin. The cone can be one of nonnegative orthant, second-order cone, or semidefinite cone. LCP can be solved using proximal point method. Accordingly, the LCP is reformulated as $$\min_x \quad q^T x + \frac{\rho}{2}\|x-x^{prox}\|^2$$
$$\text{s.t.} \qquad Ax=b,\ x\in\mathcal{K}$$
$$(Prox\text{-}LCP(x^{prox}))$$

where $\rho>0$ is a parameter and $x^{prox}$ is also a parameter called as proximal point.

Prox-LCP($x^{prox}$) is an optimization problem to which homogenization techniques developed for the original QP can be applied. For instance, consider the following reformulation of Prox-LCP($x^{prox}$) to Homogeneous Proximal-LCP (HProx-LCP($x^{prox}$)) given by $$\min_{x,\tau} \quad q^T x + \frac{\rho}{2}\|x - x^{prox}\|^2 + \frac{\theta}{2}\tau^2 - \kappa\tau$$
$$\text{s.t.} \quad AX = b\tau, x \in \mathcal{K}, \tau \geq 0$$

$$HProx\text{-}LCP(x^{prox})$$

where $\theta, \kappa > 0$ are parameters and $\tau$ is an additional non-negative variable. As in the HQP, the additional nonnegative variable is used to lift the equality to the higher dimension. The parameter $\theta$ is chosen so that $$\theta + 2\text{ObjLB}(x^{prox}) > 0 \qquad \text{Equation (12)}$$

where $\text{ObjLB}(x^{prox})$ is a lower bound estimate on the HProx-LCP($x^{prox}$). Such a lower bound estimate can be obtained by solving equality constrained problem obtained after ignoring the conic constraints $$\min_{x} \quad q^T x + \frac{\rho}{2}\|x - x^{prox}\|^2 \qquad \text{Equation (13)}$$
$$\text{s.t.} \quad Ax = b$$

LCP can be solved by an algorithm described below in FIG. 8.

FIG. 8 shows an algorithm 800 for solving LCP, according to an embodiment of the present disclosure. At step 801, the algorithm 800 includes choosing $x^{prox,0}$, $\rho > 0$, $\kappa > 0$. Further, an iterative procedure is conducted. In an iteration of the iterative procedure, at step 803, the parameter $\theta$ is computed using Equation (12) and (13) for $x^{prox}$ $x^{prox,k}$. At step 805, (HProx-LCP($x^{prox,k}$)) is solved to obtain an optimal solution $x^{*,k}, \tau^{*,k}$. If $\tau^{*,k}=0$, then LCP is infeasible, and the iteration is stopped at step 807. Further, at step 809, if $\|x^{prox,k} - x^{*,k}\| \leq \epsilon$, then the optimal solution to LCP is $$\frac{x^{*,k}}{\tau^{*,k}}$$

and the iteration is stopped, else, at step 811 the next iteration is initiated by setting $x^{prox,k+1} = x^{*,k}$ and $k=k+1$.

In some implementations, the controller 101 is implemented as a model predictive controller (MPC). The MPC solves a constrained optimal control structured quadratic programming problem (OCP-QP) (e.g. equation (5)) in order to determine the control command at each control time step.

Figure 9:
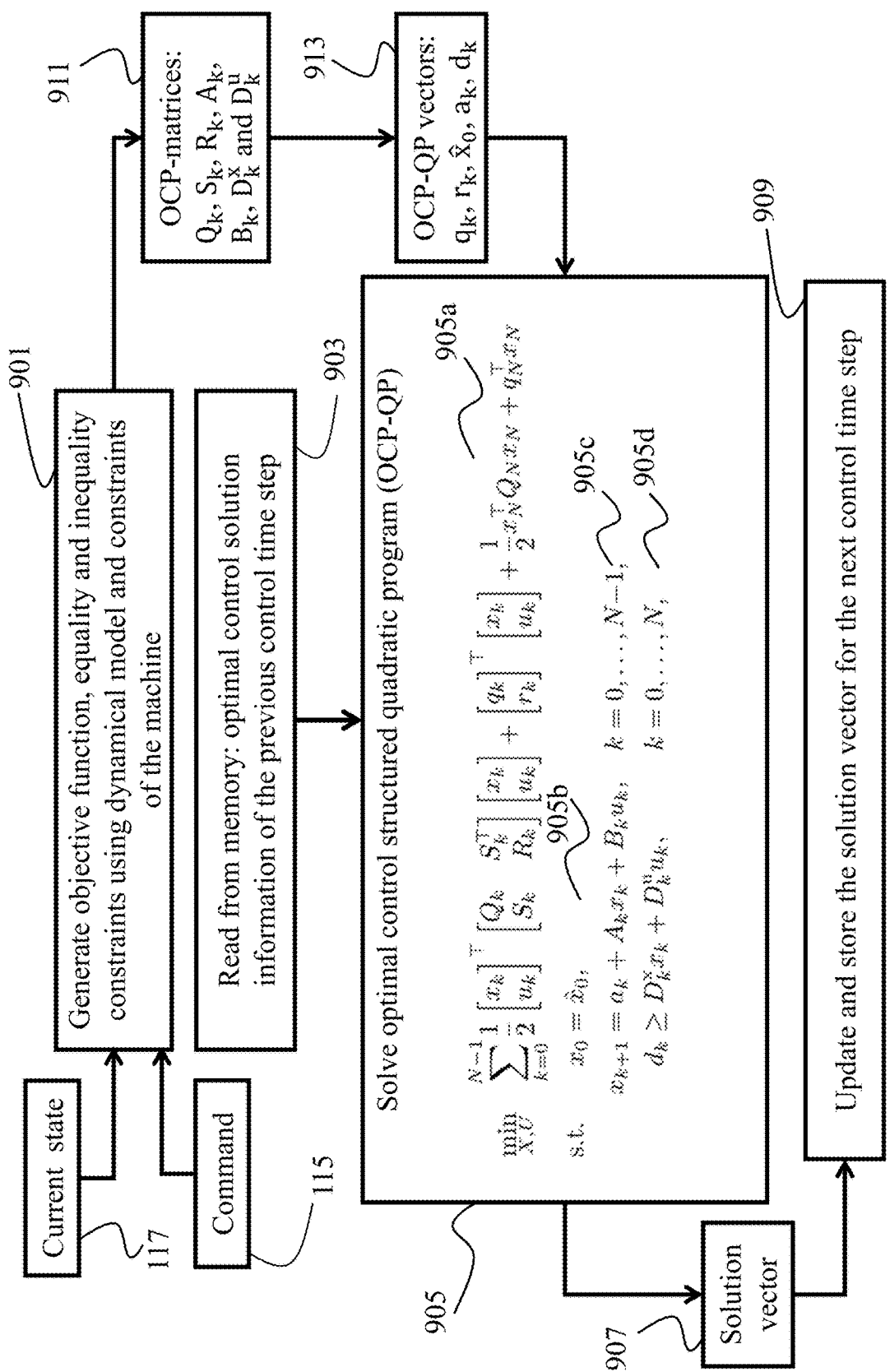
FIG. 9 shows a block diagram of a model predictive controller (MPC) for determining a control command, according to some embodiments of the present disclosure.

FIG. 9 shows a block diagram of the MPC for determining the control command, according to some embodiments of the present disclosure. The MPC is configured to solve a constrained optimal control structured quadratic programming problem (OCP-QP) in order to determine the control command, given the current state 117 of the operation of the machine 103 and the command 115. At block 901, an objective function, equality and inequality constraints are generated using the dynamical model and constraints of the machine 103. Some embodiments are based on a linear-quadratic objective function 905a, an initial state value condition 905b, a dynamical model of the machine that results in linear equality constraints 905c, linear inequality constraints 905d, and, such that the OCP-QP needs to be solved at each control time step. The OCP-QP may be based on OCP-QP matrices 911 and OCP-QP vectors 913. Examples of the OCP-QP matrices 911 include Hessian matrices, e.g., $Q_k$, $R_k$ and $S_k$ and constraint Jacobian matrices, e.g., $A_k$, $B_k$, $D_k^x$ and $D_k^u$. Examples of the OCP-QP vectors 913 include gradient vectors, e.g., $q_k$ and $r_k$ and constraint evaluation vectors, e.g., $\hat{x}_0$, $a_k$ and $d_k$.

In some embodiments, to solve the OCP-QP, exact or approximate state and/or control values over a prediction time horizon from the previous control time step are used as a solution guess in order to reduce the computational effort of solving the OCP-QP at the current control time step. Such a concept of computing a solution guess from the solution information at the previous control time step 310 is called warm-starting or hot-starting. To that end, at block 903, optimal control solution information of the previous control time step is read from memory (e.g., memory 121), and, at block 905, the OCP-QP is solved to determine a solution vector 907 that includes a sequence of control commands. At block 909, the solution vector 355 may be used to update and/or store the sequence of control commands for the next control time step.

Figure 10A:
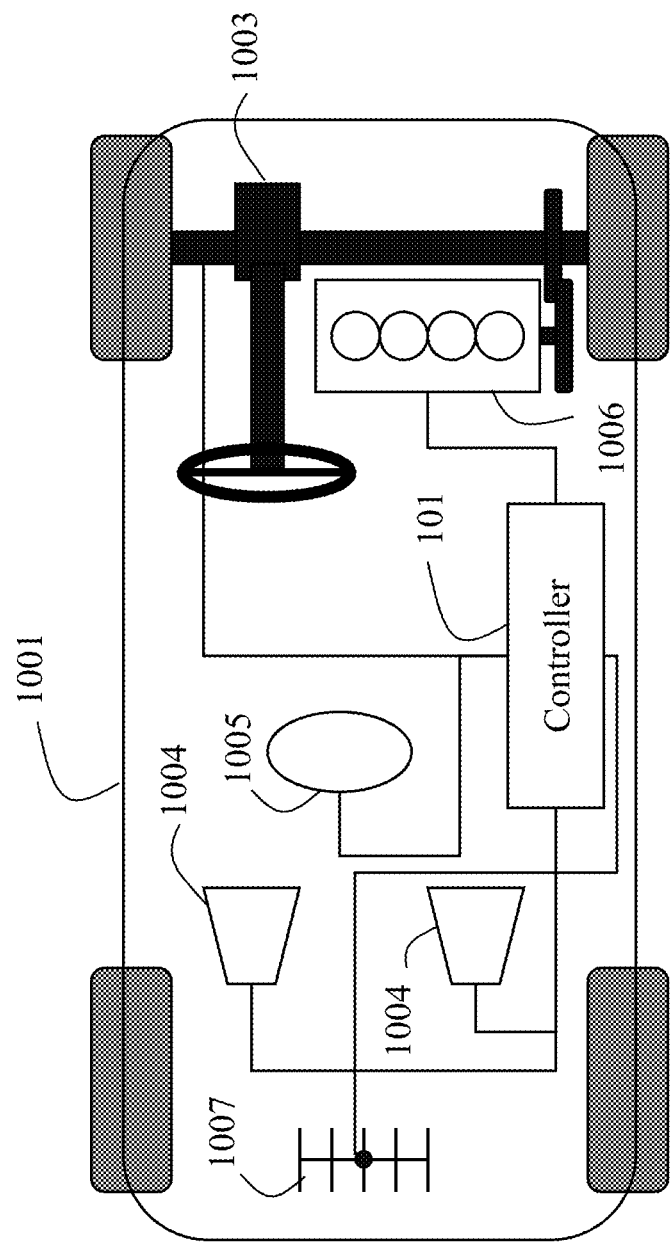
FIG. 10A shows a schematic of a vehicle including the controller for controlling the vehicle, according to some embodiments of the present disclosure.

FIG. 10A shows a schematic of a vehicle 1001 including the controller 101, according to some embodiments of the present disclosure. As used herein, the vehicle 1001 can be any type of wheeled vehicle, such as a passenger car, bus, or rover. Also, the vehicle 1001 can be an autonomous or semi-autonomous vehicle. For example, some embodiments control the motion of the vehicle 1001. Examples of the motion include lateral motion of the vehicle 1001 controlled by a steering system 1003 of the vehicle 1001. In one embodiment, the steering system 1003 is controlled by the controller 101. Additionally or alternatively, the steering system 1003 can be controlled by a driver of the vehicle 1001.

The vehicle 1001 can also include an engine 1006, which can be controlled by the controller 101 or by other components of the vehicle 1001. The vehicle can also include one or more sensors 1004 to sense the surrounding environment. Examples of the sensors 1004 include distance range finders, radars, lidars, and cameras. The vehicle 1001 can also include one or more sensors 1005 to sense its current motion quantities and internal status. Examples of the sensors 1005 include global positioning system (GPS), accelerometers, inertial measurement units, gyroscopes, shaft rotational sensors, torque sensors, deflection sensors, pressure sensor, and flow sensors. The sensors provide information to the controller 101. The vehicle can be equipped with a transceiver 1007 enabling communication capabilities of the controller 101 through wired or wireless communication channels.

Figure 10B:
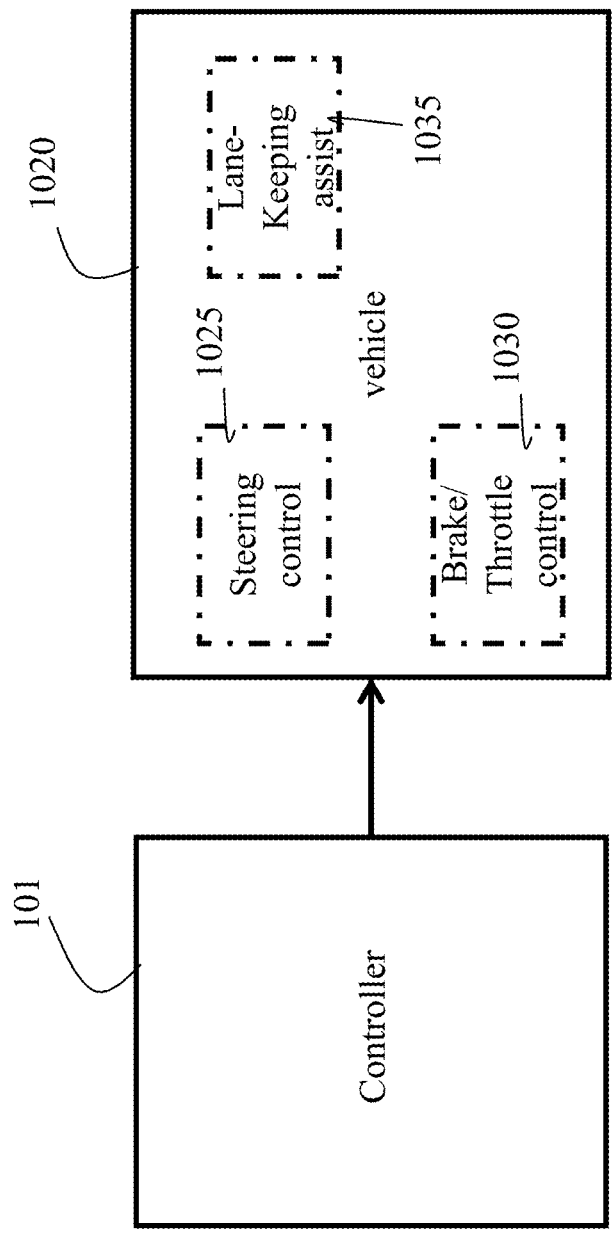
FIG. 10B shows a schematic of interaction between the controller and controllers of the vehicle, according to some embodiments of the present disclosure.

FIG. 10B shows a schematic of interaction between the controller 101 and controllers 1020 of the vehicle 1001, according to some embodiments. For example, in some embodiments, the controllers 1020 of the vehicle 1001 are steering controller 1025 and brake/throttle controllers 1030 that control rotation and acceleration of the vehicle 1001. In such a case, the controller 101 outputs control commands to the controllers 1025 and 1030 to control a state of the vehicle 1001 such as acceleration, orientation, and the like, for controlling motion of the vehicle 1001. The controllers 1020 can also include high-level controllers, e.g., a lane-keeping assist controller 1035 that further process the control commands of the controller 101. In both cases, the controllers 1020 maps use the control commands of the controller 101 to control at least one actuator of the vehicle 1001, such as the steering wheel and/or the brakes of the vehicle 1001, in order to control the motion of the vehicle 1001.

FIG. 10C shows a schematic of an autonomous or semi-autonomous vehicle 1050 controlled by the controller 101, for which a dynamically feasible, and often optimal trajectory 1055 can be computed by using principles of some embodiments. The generated trajectory 1055 aims to keep the vehicle 1050 within particular road bounds 1052, and aims to avoid other uncontrolled vehicles, i.e., obstacles 1051 for the controlled vehicle 1050. In some embodiments, each of the obstacles 1051 can be represented by one or multiple inequality constraints in a time or space formulation of the original QP. The controlled vehicle 1050 can make decisions in real time such as, e.g., pass another vehicle on the left or on the right side or instead to stay behind another vehicle within the current lane of the road 1052.

Figure 11A:
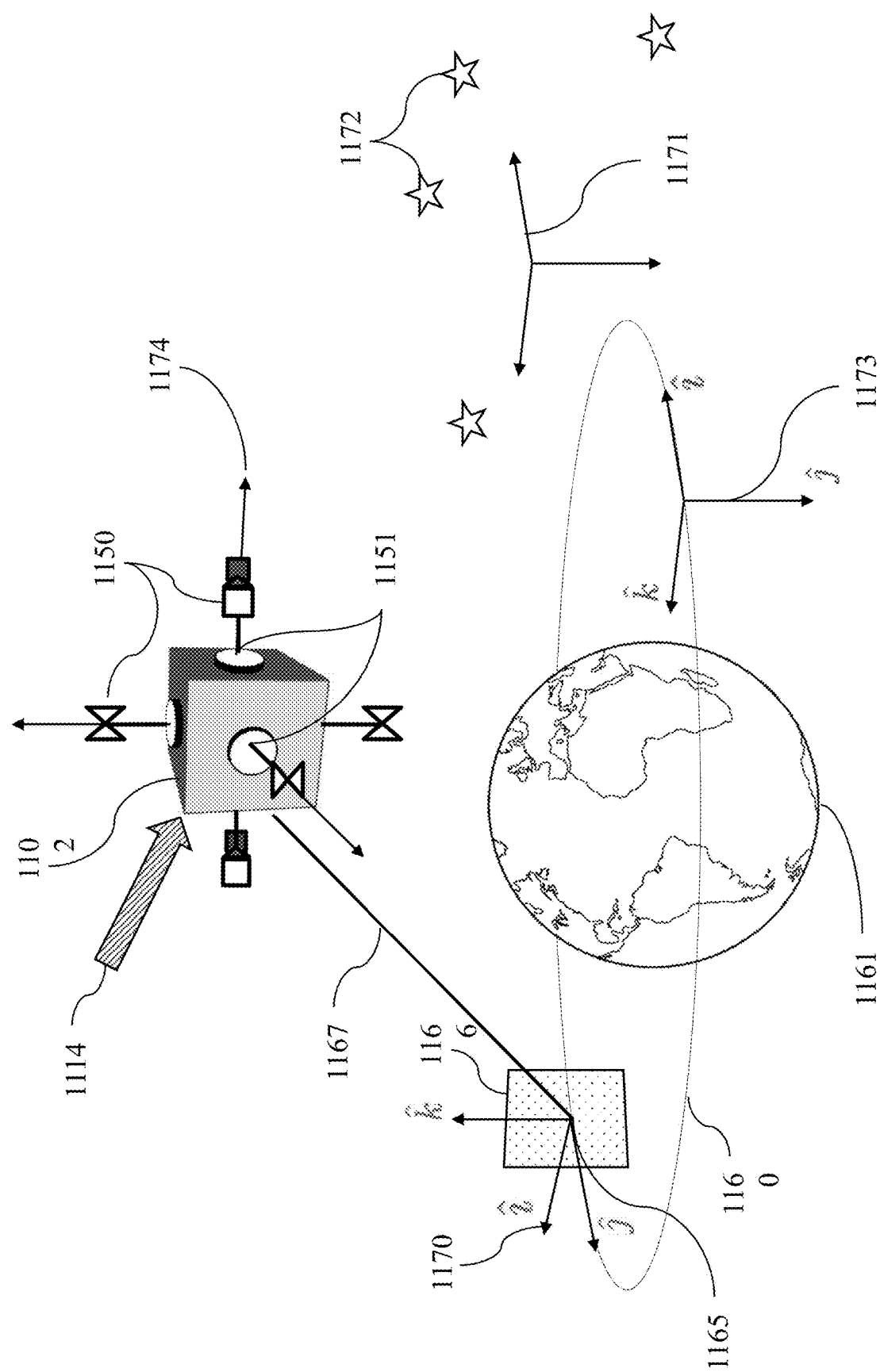
FIG. 11A and FIG. 11B show schematics of a spacecraft predictive control problem, according to some embodiments of the present disclosure.
Figure 11B:
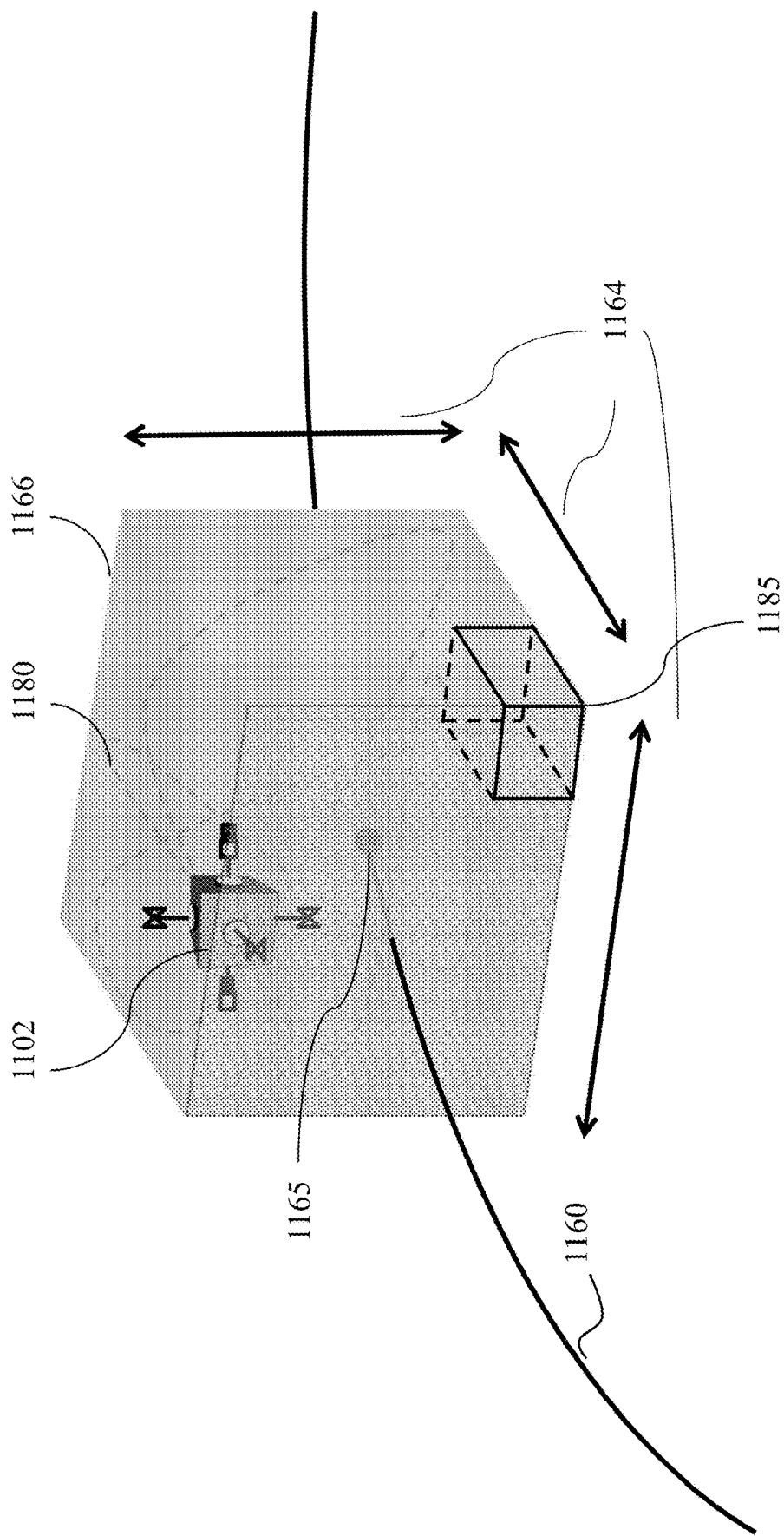

FIG. 11A and FIG. 11B show a spacecraft 1102 equipped with a plurality of actuators such as thrusters 1150 and momentum exchange devices 1151, according to some embodiments of the present disclosure. Examples of the momentum exchange devices 1151 include reaction wheels (RWs) and gyroscopes. The spacecraft 1102 is a vehicle, vessel, or machine designed to fly in outer space whose operation changes quantities such as a position of the spacecraft, its velocities, and its attitude or orientation, in response to commands that are sent to the actuators. When commanded, the actuators impart forces on the spacecraft 1102 that increase or decrease the velocity of the spacecraft 1102 and thus cause the spacecraft 1102 to translate its position, and, when commanded, the actuators also impart torques on the spacecraft 1102, which cause the spacecraft 1102 to rotate and thereby change its attitude or orientation. As used herein, the operation of the spacecraft 1102 is determined by the operation of the actuators that determine a motion of the spacecraft 1102 that changes such quantities.

The spacecraft 1102 flies in outer space along an open or closed orbital path 1160 around, between, or near one or more gravitational bodies such as the Earth 1161, moon, and/or other celestial planets, stars, asteroids, comets. Usually, a desired or target position 1165 along the orbital path is given. A reference frame 1170 is attached to a desired position 1165, where origin of the reference frame, i.e., the all zeros coordinates in that reference frame are coordinates of the desired position 1165 at all times.

The spacecraft 1102 is subject to various disturbance forces 1114. The disturbance forces 1114 can include forces that were not accounted for when determining the orbital path 1160 for the spacecraft 1102. The disturbance forces act on the spacecraft 1102 to move the spacecraft 1102 away from the desired position 1165 on the orbital path 1160. These forces can include, but are not limited to, gravitational attraction, radiation pressure, atmospheric drag, non-spherical central bodies, and leaking propellant. Thus, the spacecraft 1102 can be at a distance 1167 away from the desired position 1165.

Because of the disturbance forces, it is not always possible to keep the spacecraft 1102 at the desired position 1165 along its orbit. As such, it is desired that the spacecraft 1102 instead remains within a window 1166 with specified dimensions 1164 around the desired position 1165. To that end, the spacecraft 1102 is controlled to move along any path 1180 that is contained within the window. In this example, the window 1166 has a rectangular shape, but the shape of the window can vary for different embodiments.

The spacecraft 1102 is also often required to maintain a desired orientation. For example, a spacecraft-fixed reference frame 1174 is required to be aligned with a desired reference frame such as an inertial reference frame 1171 that is fixed relative to distant stars 1172, or a reference frame 1173 that is always oriented in a manner that points towards the Earth 1161. However, depending on the shape of the spacecraft 1102, different disturbance forces 1114 can act non-uniformly on the spacecraft 1102, thereby generating disturbance torques, which cause the spacecraft 1102 to rotate away from its desired orientation. In order to compensate for the disturbance torques, the momentum exchange devices 1151 such as reaction wheels are used to absorb the disturbance torques, thus allowing the spacecraft 1102 to maintain its desired orientation. So that the momentum exchange devices 1151 do not saturate, and thereby lose the ability to compensate for the disturbance torques, their stored momentum must be unloaded, e.g., by reducing spin rates of the reaction wheels. Unloading the momentum exchange devices 1151 imparts an undesired torque on the spacecraft 1102. Such an undesired torque is also compensated for by the thrusters.

In some embodiments, the controller 101 is configured to determine control commands for the spacecraft 1102, based on the solution of the original QP, which causes the spacecraft 1102 to remain outside of a particular zone 1185 with specified dimensions, close to the desired position 1165 along the orbit 1160. The latter zone can be either fixed in time or it can be time varying and is often referred to as an exclusion zone 1185, for which the corresponding inequality constraints can be modeled within the original QP formulation. In this example, the exclusion zone 1185 has a rectangular shape, and it is positioned in a corner of the desired window 1166, but the shape and position of the exclusion zone within the desired target window can vary for different embodiments.

Figure 12A:
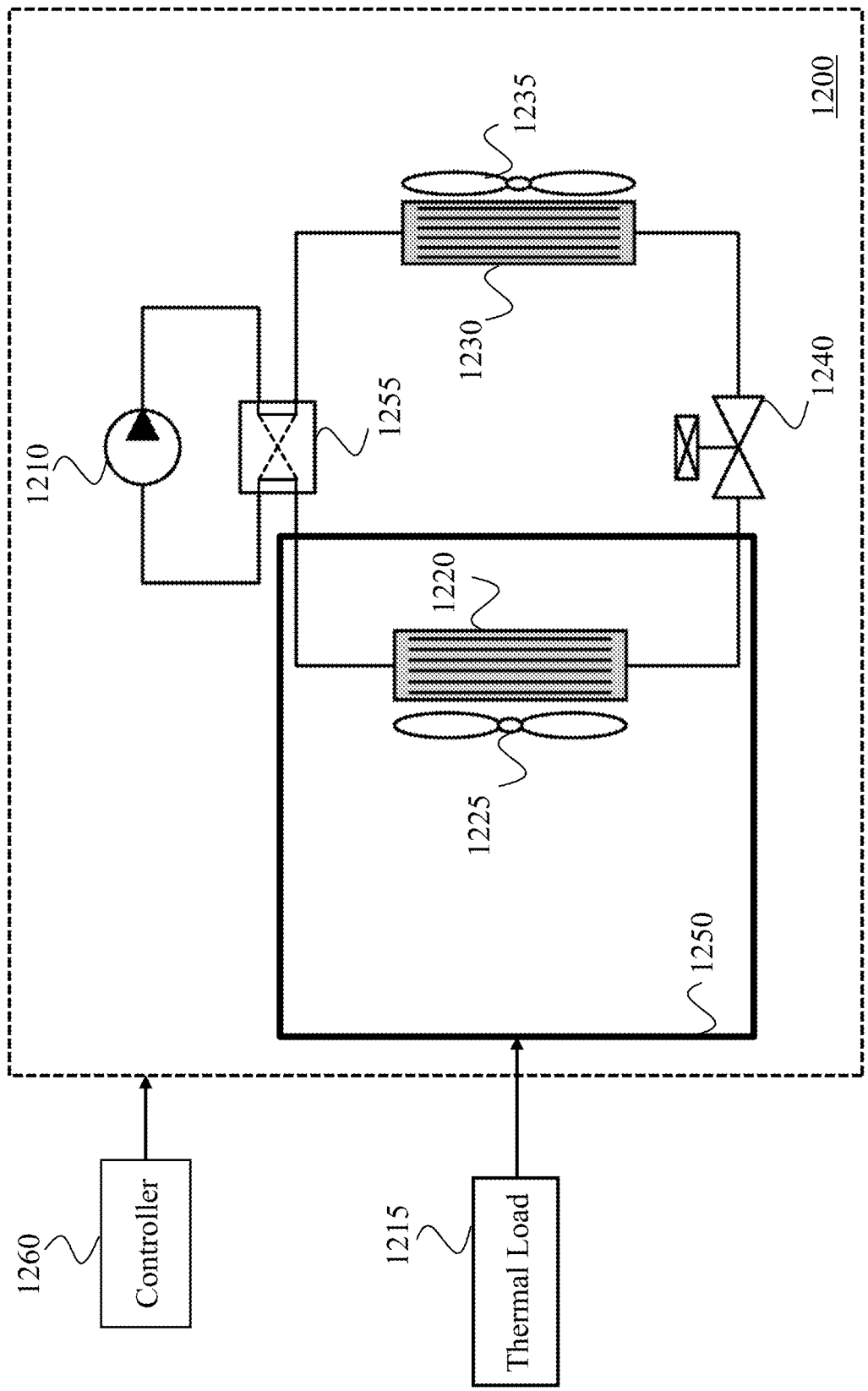
FIG. 12A and FIG. 12B show schematics for controlling of a vapor compression system (VCS) by the controller, according to some embodiments of the present disclosure.

FIG. 12A shows a schematic of a vapor compression system 1200 controlled by a controller 101, according to some embodiments of the present disclosure. According to an embodiment, the controller 101 includes a predictive controller, such as a controller implementing a model predictive control (MPC). The controller 101 is communicatively coupled to the vapor compression system 1200. The vapor compression system (VCS) 1200 can include an indoor heat exchanger 1220 located in an indoor space or zone 1250, an outdoor unit heat exchanger 1230 located in an ambient environment, a compressor 1210 and an expansion valve 1240. A thermal load 1215 acts on the indoor space or zone 1250.

Additionally, the VCS 1200 can include a flow reversing valve 1255 that is used to direct high pressure refrigerant exiting compressor to either the outdoor unit heat exchanger 1230 or the indoor unit heat exchanger 1220, and direct low pressure refrigerant returning from either the indoor unit heat exchanger 1220 or the outdoor unit heat exchanger 1230 to inlet of the compressor. In the case where high pressure refrigerant is directed to the outdoor unit heat exchanger 1230, the outdoor unit heat exchanger 1230 acts as a condenser and the indoor unit acts as an evaporator, wherein the VCS 1200 rejects heat from the zone 1250 to the ambient environment, which is operationally referred to as "cooling mode." Conversely, in the case where the high pressure refrigerant is directed to the indoor unit heat exchanger 1220, the indoor unit heat exchanger 1220 acts as a condenser and the outdoor unit heat exchanger 1230 acts as an evaporator, extracting heat from the ambient environment and pumping this heat into the zone 1250, which is operationally referred to as "heating mode."

Figure 12B:
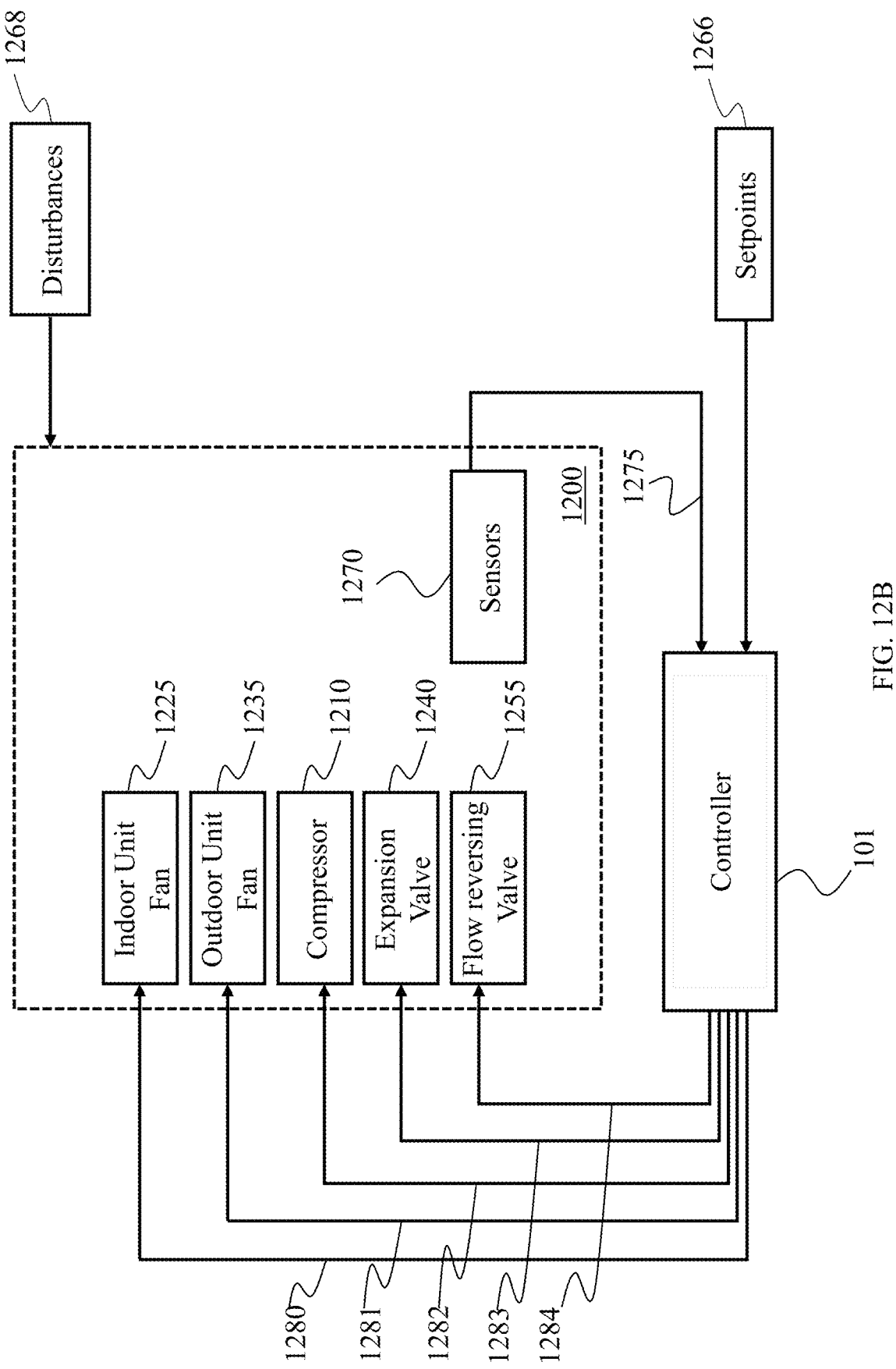

FIG. 12B shows an example of configuration of signals, sensors, and the controller 101 used in the VCS 1200, according to some embodiments of the present disclosure. The controller 101 reads information from sensors 1270 configured to measure various temperatures, pressures, flow rates or other information about the operation of the VCS 1200, including measurable disturbances such as ambient air temperature. The controller 101 can be provided with setpoints 1266 that represent desired values of measured signals of the process such as a desired zone temperature. The setpoints 1266 may be obtained from a thermostat, wireless remote control, or internal memory or storage media. The controller 101 then computes control commands such that some measured outputs are driven to their setpoints. The computed control commands can include an indoor unit fan speed 1280, an outdoor unit fan speed 1281, a compressor rotational speed 1282, an expansion valve position 1283, and a flow reversing valve position 1284. In this manner, the controller 101 controls operation of the VCS 1200 such that the setpoint values are achieved in presence of disturbances 1268, such as a thermal load, acting on the VCS 1200.

Some embodiments are based on the realization that the controller 101 can also be used to control a power system. For instance, the original QP solved by the controller 101 can be derived for power grid control. Optimal Power Flow (OPF) is crucial in power system operation and planning. OPF is widely used in planning problems, or to determine optimal generation schedules in active and reactive power at operational level that minimize operational system costs subject to grid constraints. In both domains, for planning and operation, it is crucial to determine tractable formulations of the OPF problems, as they are often intertemporal coupled in form of multi-period OPF problems. Linear OPF approximations that work in full decision variable space and capture power losses are employed in power grid operations.

According to an embodiment, the linear approximation problem for a power grid with $i \in N$ buses in the power grid which are connected to generators and loads may be given by $$\min_{P_i^G, \phi} \sum_{i \in N} f_i(P_i^G) \quad \text{Equation (14)}$$
$$\text{s.t.} \quad B\phi = P^G - P^D$$
$$P^{G,min} \leq P^G \leq P^{G,max}$$

where $P_i^G$ is the active power at the bus i and $\phi_i$ is voltage angle at the bus i. The $P^D$ are demands at the buses in power grid network. The equality constraints are voltage flow constraints. Final constraints are lower and upper bounds on the generator active powers.

The controller 101 determines a solution of the linear approximation problem. The solution of the linear approximation problem may include a value of the active power at the bus i.

Figure 13:
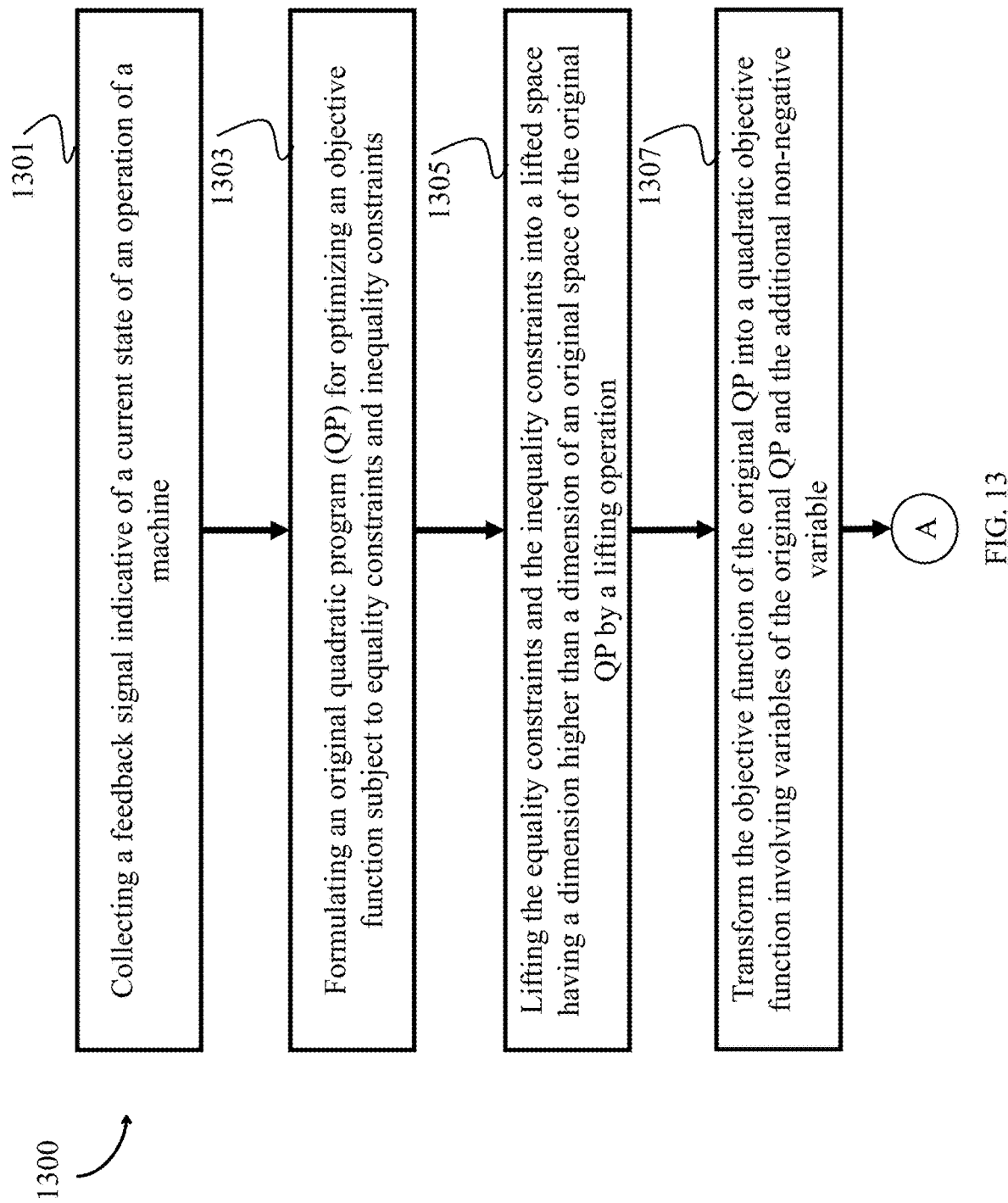
FIG. 13 shows a block diagram of an overall method for controlling an operation of a machine according to a task, according to an embodiment of the present disclosure.
Figure 13:
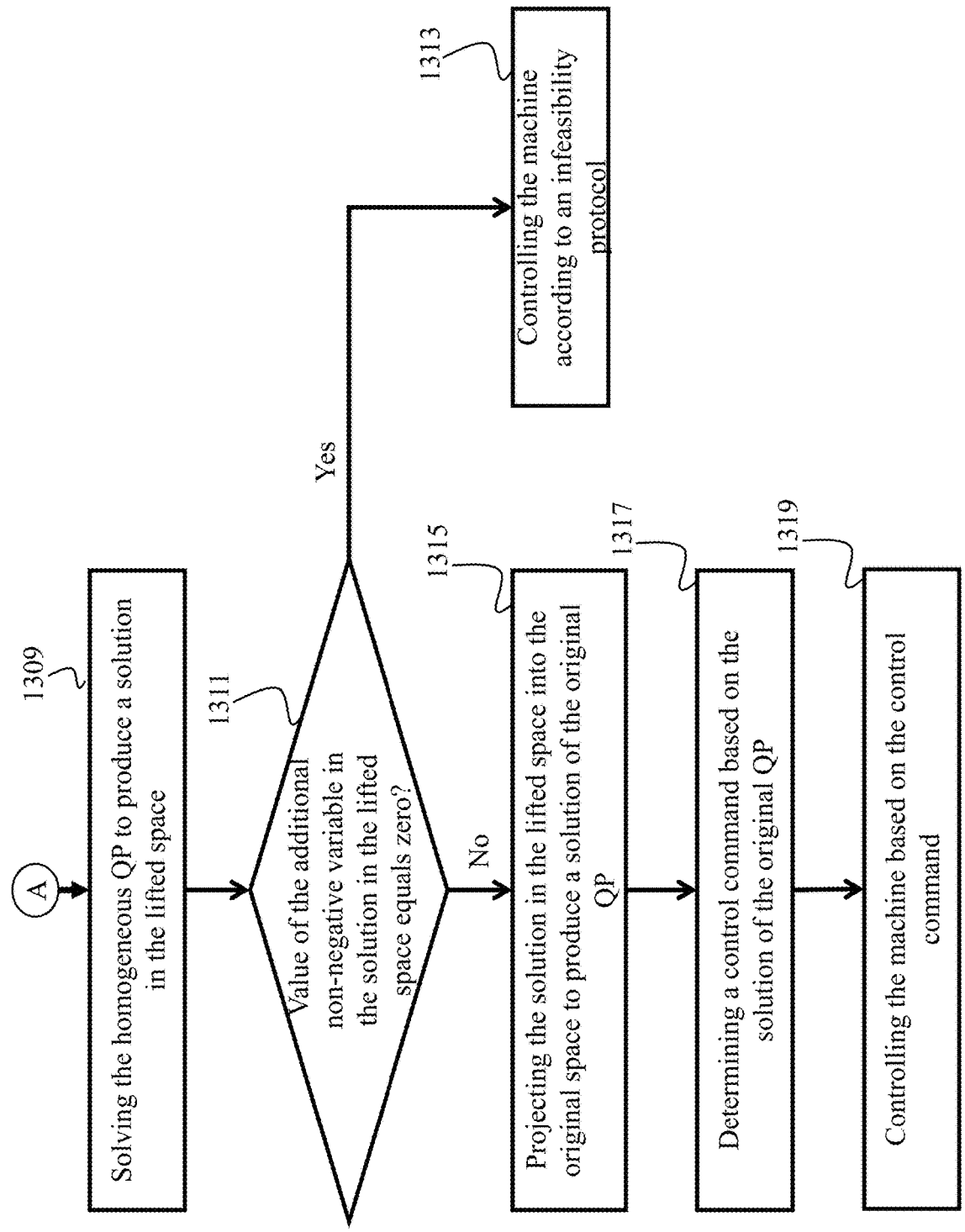

FIG. 13 shows a block diagram of an overall method 1300 for controlling an operation of a machine according to a task, according to an embodiment of the present disclosure. At block 1301, the method 1300 includes collecting a feedback signal indicative of a current state of the operation of the machine. At block 1303, the method 1300 includes formulating an original quadratic program (QP) for optimizing an objective function subject to subject to constraints. The constraints may include equality constraints and inequality constraints on one or a combination of state and control variables of the machine based on the task and the current state of the operation of the machine.

At block 1305, the method 1300 includes lifting the equality constraints and the inequality constraints into a lifted space having a dimension higher than a dimension of an original space of the original QP by a lifting operation. The lifting operation introduces an additional non-negative variable such that a subspace defined by the equality constraints in the lifted space intersects a subspace defined by the inequality constraints in the lifted space at least at a point of origin of the lifted space.

At block 1307, the method 1300 includes transforming the objective function of the original QP into a quadratic objective function involving variables of the original QP and the additional non-negative variable. The quadratic objective function subject to the lifted equality and inequality constraints forms a homogeneous QP in the lifted space such that first-order optimality conditions of the homogeneous QP correspond to first-order optimality conditions of the original QP lifted in the higher space by the lifting operation.

At block 1309, the method 1300 includes solving the homogeneous QP to produce a solution in the lifted space.

At block 1311, the method 1300 includes determining if a value of the additional non-negative variable in the solution in the lifted space equals to zero. If the value of the additional non-negative variable in the solution in the lifted space equals to zero, then, at block 1313, the method 1300 includes controlling the machine 103 according to an infeasibility protocol.

If the value of the additional non-negative variable in the solution in the lifted space is not equal to zero, then, at block 1315, the method 1300 includes projecting the solution in the lifted space into the original space using a projection operation reversing the lifting operation, to produce a solution of the original QP. For example, if the equality constraints are lifted in the lifted space by scaling the equality constraints with the additional non-negative variable, then the solution in the lifted space is projected to the original space by dividing the solution in the lifted space with the additional non-negative variable.

At block 1317, the method 1300 includes determining a control command based on the solution of the original QP. Further, at block 1319, the method 1300 includes controlling the machine based on the control command determined based on the solution of the original QP.

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Further, embodiments of the present disclosure and the functional operations described in this specification can be implemented in digital electronic circuitry, in tangibly embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, and any other kind of central processing unit. Generally, a central processing unit will receive instructions and data from a read only memory or a random access memory or both. The essential elements of a computer are a central processing unit for performing or executing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A controller for controlling an operation of a machine according to a task, the controller comprising: a memory configured to store executable instructions; and a processor configured to execute the executable instructions to cause the controller to:
   collect a feedback signal indicative of a current state of the operation of the machine;
   formulate an original quadratic program (QP) for optimizing an objective function subject to equality constraints and inequality constraints on one or a combination of state and control variables of the machine based on the task and the current state of the operation of the machine;
   lift the equality constraints and the inequality constraints into a lifted space having a dimension higher than a dimension of an original space of the original QP by a lifting operation introducing an additional non-negative variable such that a subspace defined by the equality constraints in the lifted space intersects a subspace defined by the inequality constraints in the lifted space at least at a point of origin of the lifted space;
   transform the objective function of the original QP into a quadratic objective function involving variables of the original QP and the additional non-negative variable, wherein the quadratic objective function subject to the lifted equality and inequality constraints forms a homogeneous QP in the lifted space such that first-order optimality conditions of the homogeneous QP correspond to first-order optimality conditions of the original QP lifted in the higher space by the lifting operation;
   solve the homogeneous QP to produce a solution in the lifted space;
   control the machine according to an infeasibility protocol when a value of the additional non-negative variable in the solution in the lifted space equals zero; and otherwise
   project the solution in the lifted space into the original space using a projection operation reversing the lifting operation to produce a solution of the original QP; and
   control the machine using a control command determined based on the solution of the original QP.

2. The controller of claim 1, wherein the lifting operation includes multiplication of values in the original space by the additional non-negative variable.

3. The controller of claim 2, wherein the equality constraints are lifted in the lifted space by scaling the equality constraints with the additional non-negative variable, and wherein the solution in the lifted space is projected to the original space by dividing the solution in the lifted space with the additional non-negative variable.

4. The controller of claim 2, wherein the additional non-negative variable in the lifting operation is a single additional variable.

5. The controller of claim 1, wherein the original QP is transformed such that the solution of the homogeneous QP in the lifted space is negative for positive values of the additional non-negative variable.

6. The controller of claim 1, wherein the homogeneous QP includes a quadratic term of the additional non-negative variable scaled with a scalar, and wherein the processor is further configured to:
   determine a lower bound of an objective value at the solution of the original QP; and
   determine the scalar based on the lower bound.

7. The controller of claim 6, wherein the scalar is determined as a positive value greater than the negative of the lower bound.

8. The controller of claim 1, wherein the homogeneous QP includes a quadratic term of the original QP, a linear term of the original QP scaled by the additional non-negative variable, a quadratic term of the additional non-negative variable scaled by a scalar selected to be greater than two times the negative of the lower bound of the original QP and a negative linear term of the additional non-negative variable.

9. The controller of claim 1, wherein the first-order optimality conditions of the homogeneous QP correspond to the first-order optimality conditions of the original QP lifted in the higher space by the lifting operation, and wherein the projection operation transforms a solution of the first-order conditions of the homogeneous QP whenever the additional non-negative variable is positive, to satisfy the first-order conditions of the original QP.

10. The controller of claim 1, wherein the homogeneous QP is solved based on an Interior Point Method (IPM), to determine a solution of the homogeneous QP.

11. The controller of claim 1, wherein the homogeneous QP is solved based on an Active-Set Method (ASM), to determine a solution of the homogeneous QP.

12. The controller of claim 1, wherein the homogeneous QP is solved based on an Alternating Direction Method of Multipliers (ADMM), to determine a solution of the homogeneous QP.

13. The controller of claim 12, wherein the ADDM is configured to:
   split the homogeneous QP into a first part and a second part, wherein the first part is an equality constrained program, and the second part is projection onto non-negative orthant;
   solve the first part; and
   solve the second part.

14. The controller of claim 1, wherein the machine is a vehicle, and wherein the processor is further configured to control a motion of the vehicle based on the control command determined based on the solution of the original QP.

15. The controller of claim 1, wherein the machine is a spacecraft, wherein the inequality constraints of the original QP model an exclusion zone of the spacecraft, and wherein processor is further configured to determine control commands based on the solution of the original QP, that cause the spacecraft to remain outside the exclusion zone, and control the spacecraft based on the control commands.

16. A method for controlling an operation of a machine according to a task, the method comprising:
- collecting a feedback signal indicative of a current state of the operation of the machine;
- formulating an original quadratic program (QP) for optimizing an objective function subject to equality constraints and inequality constraints on one or a combination of state and control variables of the machine based on the task and the current state of the operation of the machine;
- lifting the equality constraints and the inequality constraints into a lifted space having a dimension higher than a dimension of an original space of the original QP by a lifting operation introducing an additional non-negative variable such that a subspace defined by the equality constraints in the lifted space intersects a subspace defined by the inequality constraints in the lifted space at least at a point of origin of the lifted space;
- transforming the objective function of the original QP into a quadratic objective function involving variables of the original QP and the additional non-negative variable, wherein the quadratic objective function subject to the lifted equality and inequality constraints forms a homogeneous QP in the lifted space such that first-order optimality conditions of the homogeneous QP correspond to first-order optimality conditions of the original QP lifted in the higher space by the lifting operation;
- solving the homogeneous QP to produce a solution in the lifted space;
- controlling the machine according to an infeasibility protocol when a value of the additional non-negative variable in the solution in the lifted space equals zero; and otherwise projecting the solution in the lifted space into the original space using a projection operation reversing the lifting operation to produce a solution of the original QP; and
- controlling the machine using a control command determined based on the solution of the original QP.

17. The method of claim 16, wherein the lifting operation includes multiplication of values in the original space by the additional non-negative variable.

18. The method of claim 17, wherein the equality constraints are lifted in the lifted space by scaling the equality constraints with the additional non-negative variable, and wherein the solution in the lifted space is projected to the original space by dividing the solution in the lifted space with the additional non-negative variable.

19. The method of claim 17, wherein the additional non-negative variable in the lifting operation is a single additional variable.

20. The method of claim 16, wherein the original QP is transformed such that the solution of the homogeneous QP in the lifted space is negative for positive values of the additional non-negative variable.

21. The method of claim 16, wherein the homogeneous QP includes a quadratic term of the additional non-negative variable scaled with a scalar, and wherein the method further comprises:
- determining a lower bound of an objective value at the solution of the original QP; and
- determining the scalar based on the lower bound.

22. The method of claim 16, wherein the homogeneous QP includes a quadratic term of the original QP, a linear term of the original QP scaled by the additional non-negative variable, a quadratic term of the additional non-negative variable scaled by a scalar selected to be greater than two times the negative of the lower bound of the original QP and a negative linear term of the additional nonnegative variable.

23. A non-transitory computer-readable storage medium embodied thereon a program executable by a processor for performing a method for controlling an operation of a machine according to a task, the method comprising:
- collecting a feedback signal indicative of a current state of the operation of the machine;
- formulating an original quadratic program (QP) for optimizing an objective function subject to equality constraints and inequality constraints on one or a combination of state and control variables of the machine based on the task and the current state of the operation of the machine;
- lifting the equality constraints and the inequality constraints into a lifted space having a dimension higher than a dimension of an original space of the original QP by a lifting operation introducing an additional non-negative variable such that a subspace defined by the equality constraints in the lifted space intersects a subspace defined by the inequality constraints in the lifted space at least at a point of origin of the lifted space;
- transforming the objective function of the original QP into a quadratic objective function involving variables of the original QP and the additional non-negative variable, wherein the quadratic objective function subject to the lifted equality and inequality constraints forms a homogeneous QP in the lifted space such that first-order optimality conditions of the homogeneous QP correspond to first-order optimality conditions of the original QP lifted in the higher space by the lifting operation;
- solving the homogeneous QP to produce a solution in the lifted space;
- controlling the machine according to an infeasibility protocol when a value of the additional non-negative variable in the solution in the lifted space equals zero; and otherwise
- projecting the solution in the lifted space into the original space using a projection operation reversing the lifting operation to produce a solution of the original QP; and
- controlling the machine using a control command determined based on the solution of the original QP.

* * * * *